(12) United States Patent
Wang et al.

(10) Patent No.: US 7,138,483 B2
(45) Date of Patent: Nov. 21, 2006

(54) MONOMERS, CONJUGATED POLYMERS AND ELECTRONIC DEVICES USING SUCH POLYMERS

(75) Inventors: Hailiang Wang, Camarillo, CA (US); Frank P. Uckert, Santa Barbara, CA (US); Sunghan Kim, Goleta, CA (US)

(73) Assignees: E.I. du Pont de Nemours and Company, Wilmington, DE (US); DuPont Displays, Inc., Santa Barbara, CA (US)

( * ) Notice: Subject to any disclaimer, the term of this patent is extended or adjusted under 35 U.S.C. 154(b) by 0 days.

(21) Appl. No.: 10/771,014

(22) Filed: Feb. 3, 2004

(65) Prior Publication Data

US 2004/0192871 A1 Sep. 30, 2004

Related U.S. Application Data

(60) Provisional application No. 60/446,823, filed on Feb. 12, 2003.

(51) Int. Cl.
C08G 69/00 (2006.01)
C08G 75/00 (2006.01)
C08G 73/00 (2006.01)
C07D 291/00 (2006.01)
C07D 277/00 (2006.01)

(52) U.S. Cl. .............. 528/327; 528/373; 528/377; 528/380; 528/394; 528/396; 528/397; 528/401; 528/422; 528/423; 528/341; 528/345; 528/347; 528/364; 528/424; 548/100; 548/122; 548/126; 548/146; 548/147

(58) Field of Classification Search ............ 528/327, 528/397, 394
See application file for complete search history.

(56) References Cited

U.S. PATENT DOCUMENTS

| | | | |
|---|---|---|---|
| 4,486,576 A | 12/1984 | Colon et al. | |
| 4,508,639 A | 4/1985 | Camps et al. | |
| 5,597,890 A | 1/1997 | Jenekhe | |
| 5,621,131 A | 4/1997 | Kreuder et al. | |
| 5,708,130 A | 1/1998 | Woo et al. | |
| 5,777,070 A | 7/1998 | Inbasekaran et al. | |
| 5,814,244 A | 9/1998 | Kreuder et al. | |
| 5,821,002 A | 10/1998 | Ohnishi et al. | |
| 5,856,434 A | 1/1999 | Stern et al. | |
| 5,900,327 A | 5/1999 | Pei et al. | |
| 5,962,631 A | 10/1999 | Woo et al. | |
| 5,998,045 A | 12/1999 | Chen et al. | |
| 6,107,452 A | 8/2000 | Miller et al. | |
| 6,124,046 A | 9/2000 | Jin et al. | |
| 6,169,163 B1 | 1/2001 | Woo et al. | |
| 6,204,515 B1 | 3/2001 | Bernius et al. | |
| 6,255,449 B1 | 7/2001 | Woo et al. | |
| 6,309,763 B1 | 10/2001 | Woo et al. | |
| 6,353,083 B1 | 3/2002 | Inbasekaran et al. | |
| 6,355,756 B1 | 3/2002 | Hawker et al. | |
| 6,541,602 B1 | 4/2003 | Spreitzer et al. | |
| 6,605,373 B1 | 8/2003 | Woo et al. | |
| 6,653,438 B1 | 11/2003 | Spreitzer et al. | |
| 2001/0024738 A1 | 9/2001 | Hawker et al. | |
| 2002/0013451 A1 | 1/2002 | Huang et al. | |
| 2002/0028347 A1 | 3/2002 | Marrocco, III et al. | |
| 2002/0045719 A1 | 4/2002 | Hawker et al. | |
| 2002/0051895 A1 | 5/2002 | Cho et al. | |
| 2002/0103332 A1 | 8/2002 | Leclerc et al. | |
| 2004/0192871 A1* | 9/2004 | Wang et al. | 528/4 |
| 2004/0204557 A1* | 10/2004 | Uckert et al. | 528/4 |

FOREIGN PATENT DOCUMENTS

| | | |
|---|---|---|
| EP | 0 259 229 B1 | 9/1987 |
| EP | 0 956 312 B1 | 1/1998 |
| EP | 1 213 336 A2 | 6/2002 |
| EP | 1 281 745 A1 | 2/2003 |
| EP | 1 205 526 B1 | 9/2004 |
| WO | WO 99/54943 A1 | 10/1999 |
| WO | WO 00/53656 A1 | 9/2000 |
| WO | WO 00/55927 A1 | 9/2000 |
| WO | WO 01/07502 A2 | 2/2001 |
| WO | WO 01/77203 A2 | 10/2001 |
| WO | WO 02/090415 A1 | 11/2002 |
| WO | WO 02/092724 A1 | 11/2002 |
| WO | WO 03/050086 A1 | 6/2003 |
| WO | WO 2004/015025 A1 | 2/2004 |

OTHER PUBLICATIONS

Macromolecules 2002, 35, pp. 3474-3483, Jianfu Ding et al "Synthesis and Characterization of Alternating Copolymers of Fluorene and Oxadiazole".*

(Continued)

*Primary Examiner*—P. Hampton Hightower
(74) *Attorney, Agent, or Firm*—John H. Lamming

(57) ABSTRACT

The energy levels (HOMO, LUMO) of the conjugated polymer are tuned independently, so that an energy match on both sides of the device can be accomplished while keeping the emission color in the blue region. Such polymers can be formed by polymerization of a mixture of monomers. The mixture of the monomers contains at least one monomer having an electron-deficient group sandwiched by two aromatic hydrocarbon groups ("Monomer (I)") and at least one hole transporting ("HT") monomer. The mixture of monomers may also contain a solubility enhancement ("SE") monomer and/or a Branching Monomer. Such polymers can be used in fabricating light emitting diodes to achieve some of the best device performance to date including high efficiency and blue color purity.

7 Claims, 9 Drawing Sheets

OTHER PUBLICATIONS

Chemical Materials, 2003, 15, pp. 269-274,Fang-Iy Wu et al, "Novel Oxadiazole-Containing Polyfluorene with Efficient Blue Electroluminescence".*

Macromolecules 2003, 36, pp. 6698-6703, Ching-Fong Shu et al, "Articles".*

Macromolecules 2004m, 37, pp.6395-6400, Yaqin Fu et al, "High Molecular Weight Dendronized Poly(fluorene)s with Peripheral Carbazole Groups: Synthesis, Characterization and Properties."*

Antoniadis, Homer et al., Applied Physics Letters, Blue-green organic light-emitting diodes based on fluorene-oxadiazole compounds, Nov. 23, 1998, 3055-3057, 73(21), American Institute of Physics.

Morin, Jean-Francois et al., Syntheses of Conjugated Polymers Derived from N-Alkyl-2,7-carbazoles, Macromolecules, 2001, 4680-4682, 34, American Chemical Society.

Zhan, Xiaowei et al., New Series of Blue-Emitting and Electron-Transporting Copolymers Based on Fluorene, Macromolecules, 2002, 2529-2537, 35, American Chemical Society.

Ding, Jianfu et al., Synthesis and Characterization of Alternating Copolymers of Fluorene and Oxadiazole, Macromolecules, 2002, 3474-3483, 35, American Chemical Society.

DE 19846767, Partially conjugated polymer useful as an organic semiconductor or an electroluminescence material, and for display elements in television monitor and illumination technology contains fluorene building units, Abstract, Jun. 13, 2000, Aventis Res & Technologies Gmbh.

JP 2000319272, (Diarylamino) furan analogues with improved stability, useful pharmaceutical intermediates and electron hole transport or photosensitive materials, Abstract, Apr. 21, 2001, Tosoh Corp.

JP 08157575, Carrier transport polymers—useful as carrier transport materials in organic thin film electroluminescence devices, Abstract, Oct. 25, 1996, Toppan Printing Co. Ltd.

JP 2000143778, Display element such as cathode ray tube and light emitting diode, comprises specified light emitting compound as color developing materials, Abstract, Oct. 6, 2000, Samsung Denkan KK.

JP 10273522, Production of phenylene group-containing copolymers—comprises copolymerizing phenylene group-containing compounds in presence of catalysts containing transition metal compounds, Abstract, Jan. 13, 1999, Nippon Gosel Gomu KK.

JP 10273521, Production of phenylene group-containing copolymers—comprises copolymerizing phenylene group-containing compounds in presence of catalysts containing transition metal compounds, Abstract, Dec. 23, 1999, Nippon Gosel Gomu KK.

JP 03028220, Electrochromic elements for display or optical shield glass—contg. film of polyphenylene polymer derived from fluorene, Abstract, Sep. 28, 1993, Idemitsu Kosan Co. Ltd.

JP 03017120, Polyphenylene polymers used as conductive material or display material are produced by chemical or electrochemical-oxidative polymerizing of specified fluorene derivs, Abstract, Sep. 28, 1993, Idemitsu Kosan Co. Ltd.

JP 02269734, New polyphenylene-type polymer prepd. By oxidn. Polymerization of fluroene derive., Abstract, Sep. 28, 1993, Idemitsu Kosan Co. Ltd.

KR 99057430, Fluorene-based alternating statistical copolymer containing multi-luminescence groups and electroluminescence device using the same, Abstract, Jul. 15, 1999, Korea Adv Inst Sci & Technology.

Cowell, Allan B. et al., Fluoroalkylation of Aromatic Compounds, Journal of Fluorine Chemistry, 17, 1981, 345-356, Elsevier Sequoia S.A., Lausanne, The Netherlands.

Kamigata, Nobumasa et al., Direct Perfluoroalkylation of Aromatic and Heteroaromatic Compounds with Perfluoroalkanesulfonyl Chlorides Catalysed by a Ruthenlum (II) Phosphine Complex, J. Chem. Soc.Perkin Trans., 1, 1994, 1339-1346.

* cited by examiner

MONOMERS, CONJUGATED POLYMERS AND ELECTRONIC DEVICES USING SUCH POLYMERS

This application claims priority to provisional application Ser. No. 60/446,823, dated Feb. 12, 2003.

BACKGROUND OF THE INVENTION

1. Field of the Invention

The invention relates generally to monomers and conjugated polymers, and their use in electronic devices.

2. Description of the Related Art

The use of organic light-emitting displays is increasing as a replacement for liquid crystal displays (LCD) in many applications. Patents and articles address ways to maximize the quantum efficiency of the organic light-emitting diodes (OLEDs) as well as change the color of the light emitted from organic light-emitting diodes (OLEDs).

Equalizing the amount of carriers injected from the cathode and anode can increase the quantum efficiency of the light-emitting diode (LED) device. Carrier injection is sensitive to the height of the energy barriers at the interface between an electrode and the polymer in an organic LED. In the past, the highest occupied molecular orbital (HOMO) or lowest unoccupied molecular orbital (LUMO), have been tuned to increase efficiency and/or change color.

In U.S. Provisional Patent Application No. 60/384,494, which is assigned to the current assignee hereof and incorporated herein by reference, discloses a new class of polymer with tunable energy levels. This earlier approach offers the opportunity to match the LUMO of the polymer with the work function of the material of the cathode.

Controlling the energy level of the polymer so that the HOMO matches the work function of the anode and the LUMO matches the work function of the cathode without changing the emission color can be a challenge. This is especially true for blue light emitting polymers.

SUMMARY OF THE INVENTION

The energy levels (HOMO, LUMO) of the conjugated polymer are tuned independently, so that an energy match with both electrodes of the device can be accomplished while keeping the emission color in the blue region. Such polymers are formed by polymerization of a mixture of monomers. The mixture of the monomers contains at least one monomer having an electron-deficient group sandwiched between two aromatic hydrocarbon groups (Monomer (I)) and at least one second monomer. The mixture of monomers may also contain a solubility enhancement (SE) monomer and/or a Branching Monomer. Such polymers can be used in fabricating light emitting diodes to achieve some of the best device performance to date including high efficiency and blue color purity.

A molecule, referred to as Monomer (I), has Formula I below:

(I)

wherein:
A is selected from Cl, Br, I, and tosylate;
Q is an aromatic group; and
Z is an electron deficient group.

In one embodiment, Q is an aromatic group with at least one substituent selected from alkyl, heteroalkyl, alkenyl, heteroalkenyl, alkynyl, heteroalkynyl, aryl, arylalkyl, heteroaryl, heteroarylalkyl, and NR', where R' is H or an alkyl.

A polymer, referred to as Polymer (I) has Formula II below:

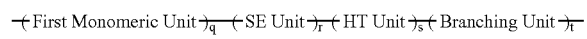
(II)

wherein:
the First Monomeric Unit has Formula III below:

(III)

where Q and Z are as described above for Monomer (I);
the HT Unit is a monomeric unit having an electron rich group;
the SE Unit is a monomeric unit having substituted aromatic groups;
the Branching Unit is a monomeric unit having more than two linkage sites;
q is an integer; and
r, s and t are zero or an integer, with the proviso that at least one of r, s, and t is an integer.

In Polymer (I), q, r, s, and t reflect the statistical distribution of monomeric units in the polymer, such that:
the First Monomeric Unit is present in a range of approximately 1–99 mol %;
the HT Unit is present in a range of approximately 0–99 mol %;
the SE Unit is present in a range of approximately 0–98 mol %; and
the Branching Unit is present in a range of approximately 0–5 mol %.

The overall degree of polymerization of Polymer (I) is at least 10.

A process for forming Polymer (I) is to react a mixture of monomers with a Ni(0) compound, said mixture of monomers comprising:
(a) the molecule comprising the structure in Formula I below:

(I)

wherein:
A is Cl;
Q is an aromatic group; and
Z is an electron deficient group; and
(b) a second monomer having two chloro functional groups.

The foregoing general description and the following detailed description are exemplary and explanatory only and are not restrictive of the invention, as defined in the appended claims.

BRIEF DESCRIPTION OF THE DRAWINGS

The invention is illustrated by way of example and not limitation in the accompanying figures.

Figure 1:
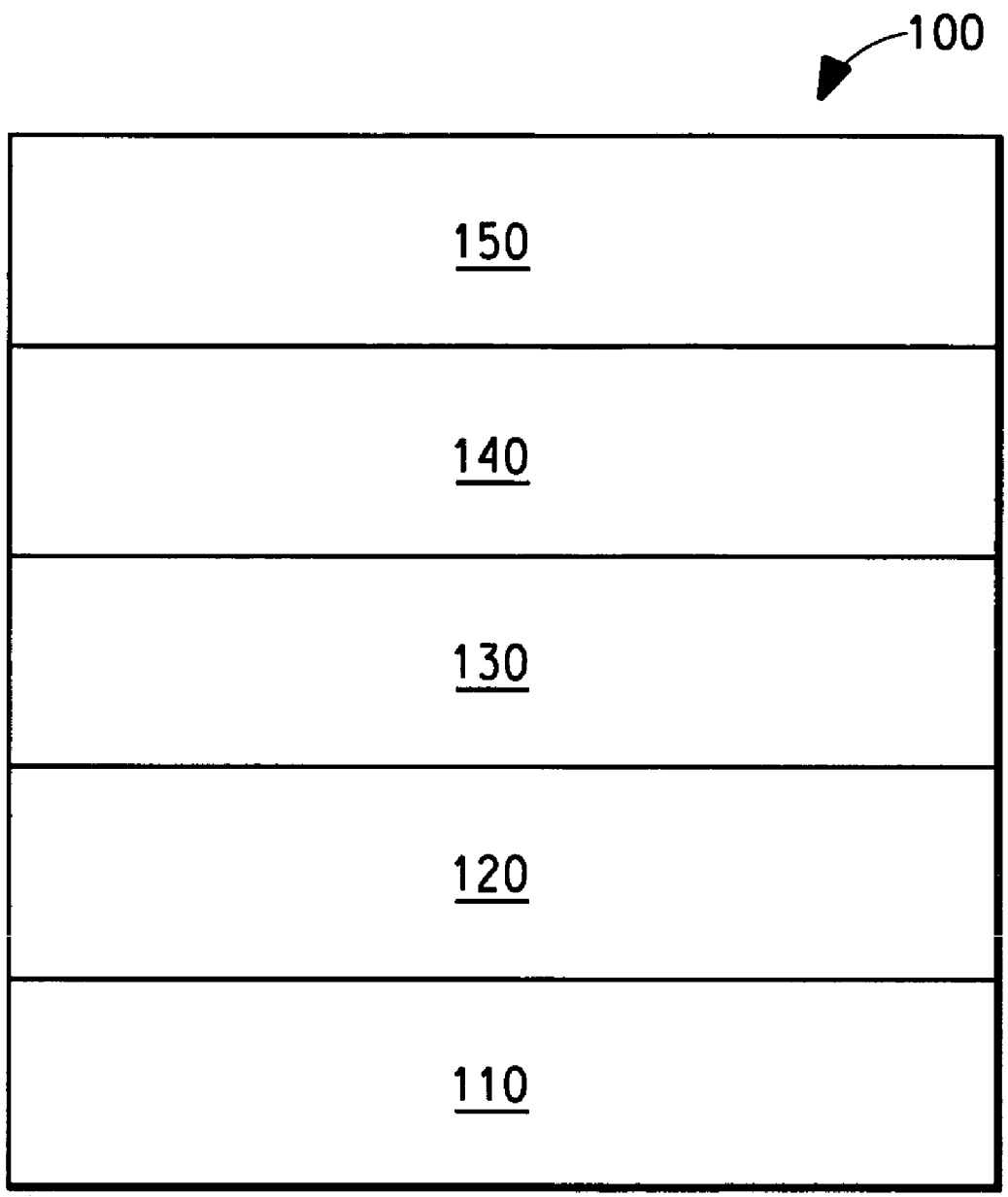
FIG. 1 includes an illustration of a cross-sectional view of an electronic device that includes a polymer in accordance with an embodiment of the present invention.
Figure 2:
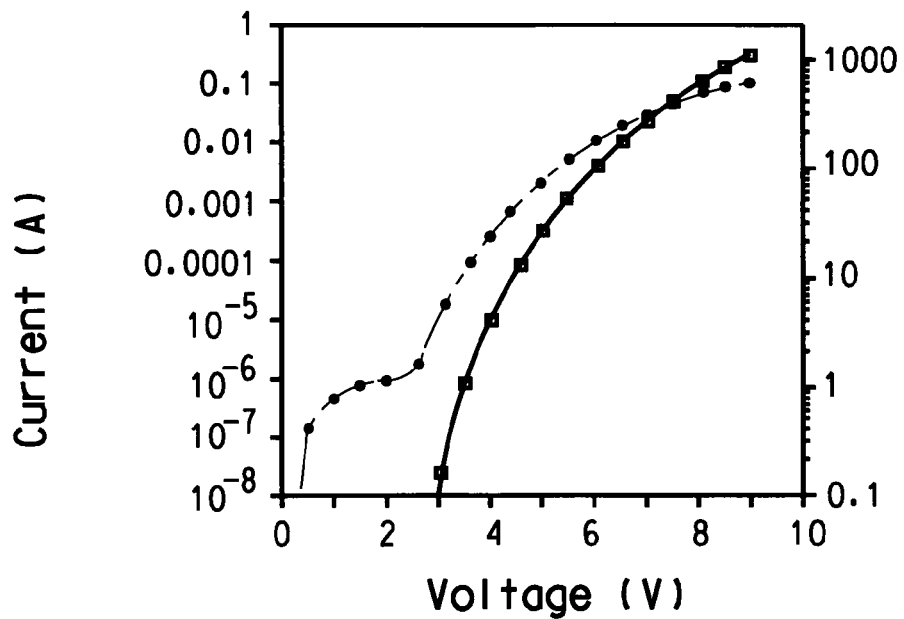
FIGS. 2–5 includes plots showing how current and luminance for light emitting diode devices changes with voltage for some of the examples.
Figure 3:
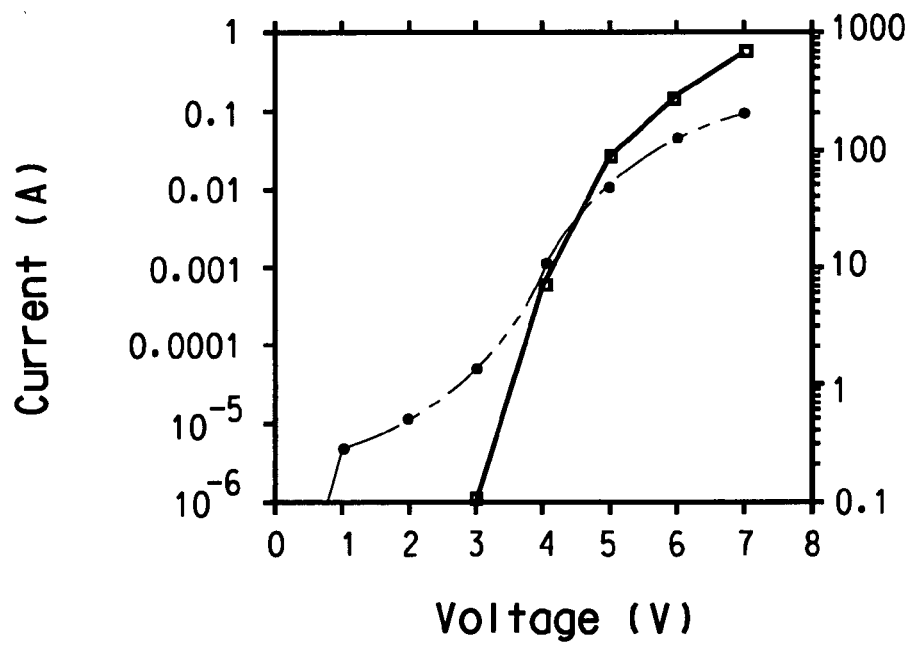
Figure 4:
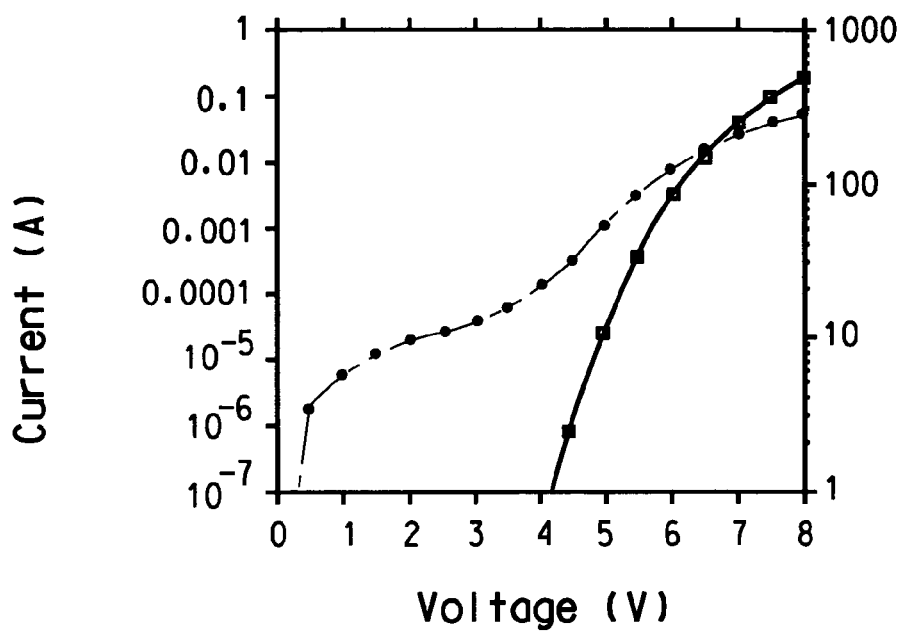
Figure 5:
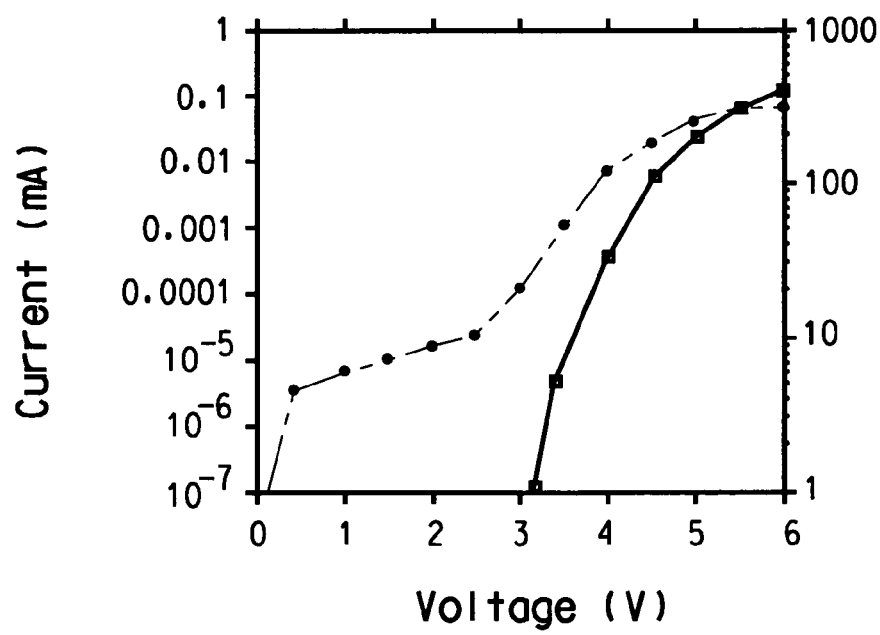
Figure 6:
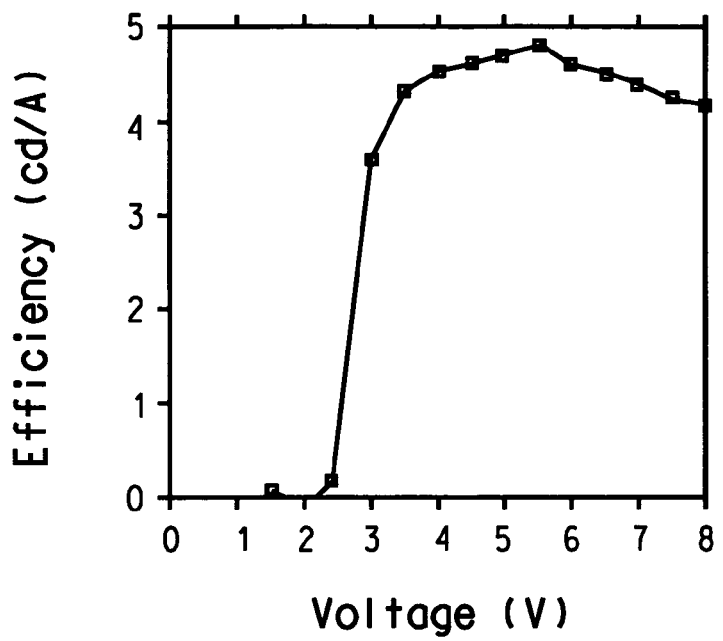
FIGS. 6–9 include plots showing how efficiency for light emitting diode devices changes with voltage for some of the examples.
Figure 7:
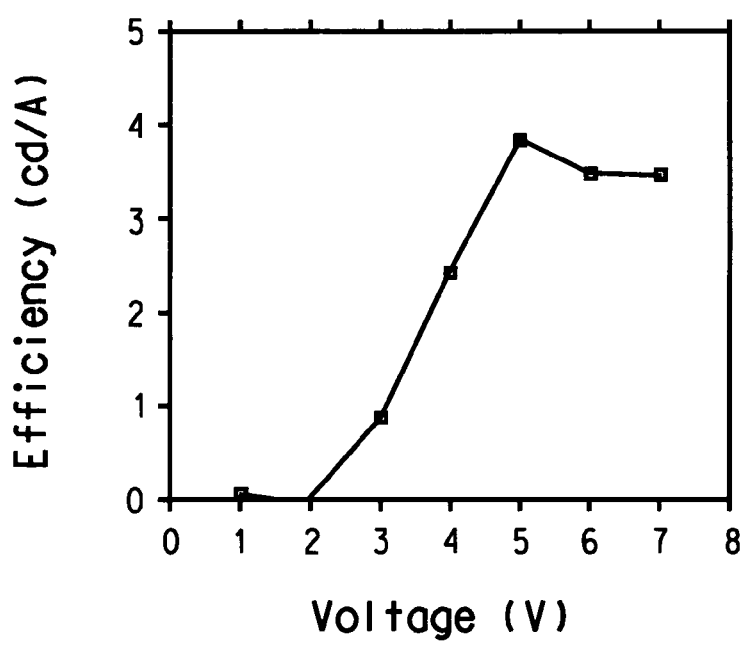
Figure 8:
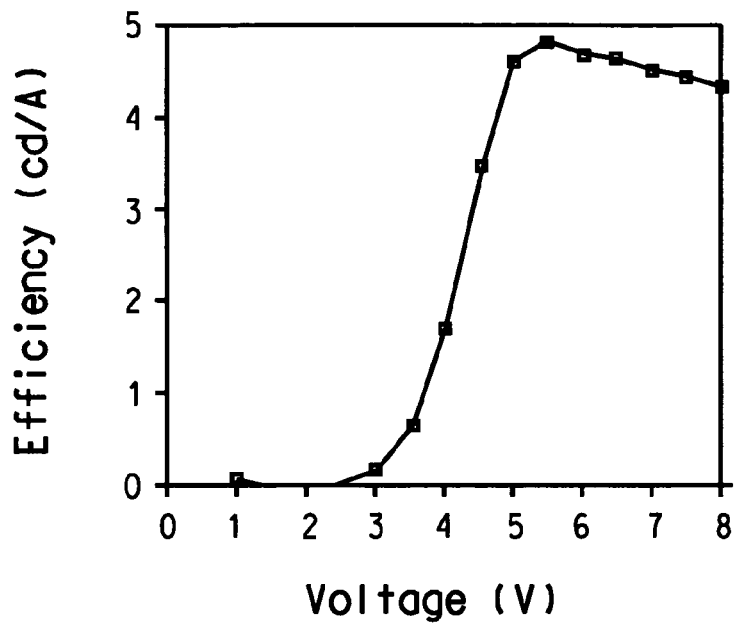
Figure 9:
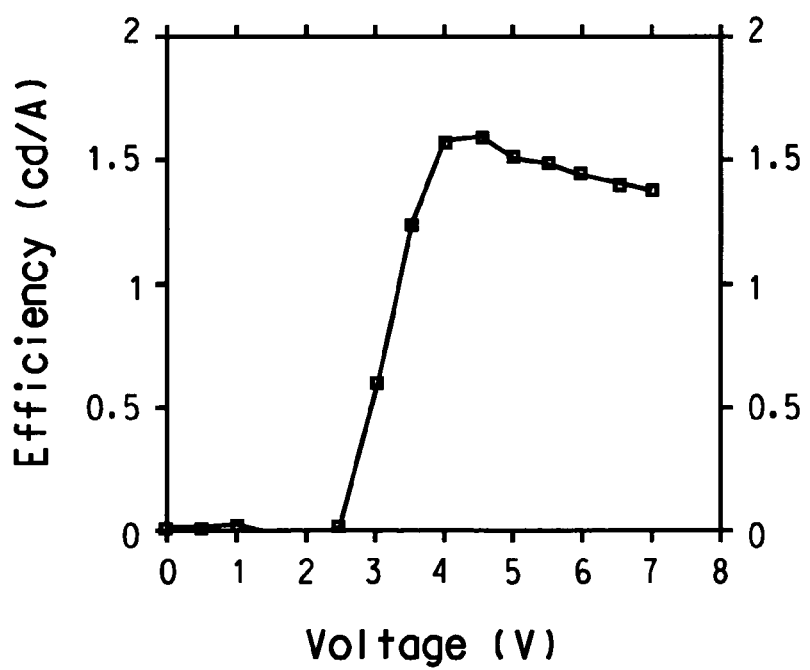
Figure 10:
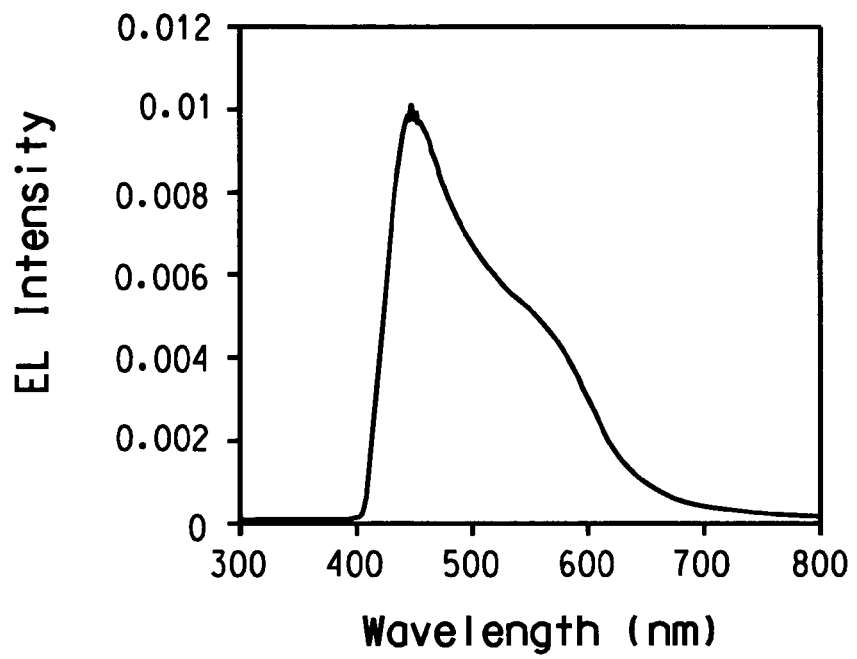
FIGS. 10–13 include plots showing electroluminescence spectra for light emitting diode devices for some of the examples.
Figure 11:
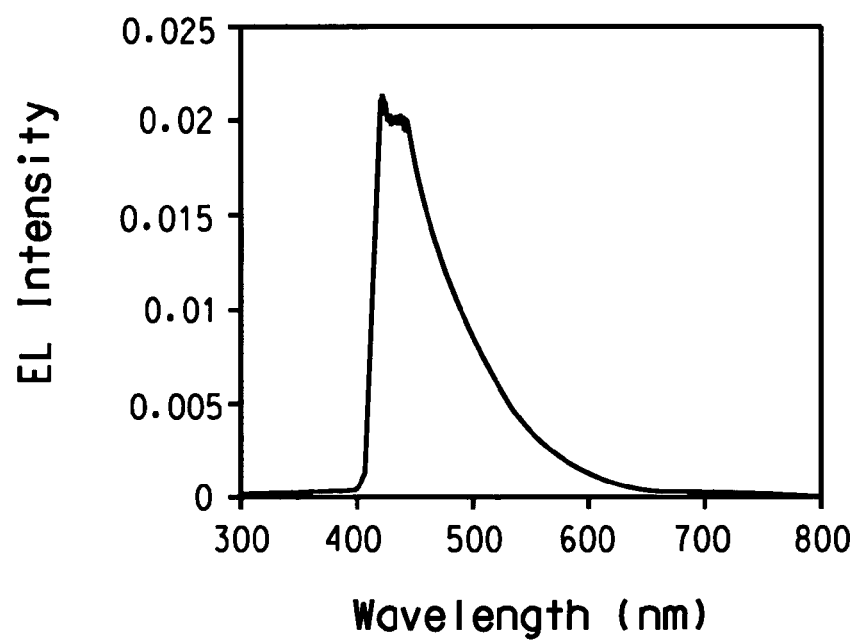
Figure 12:
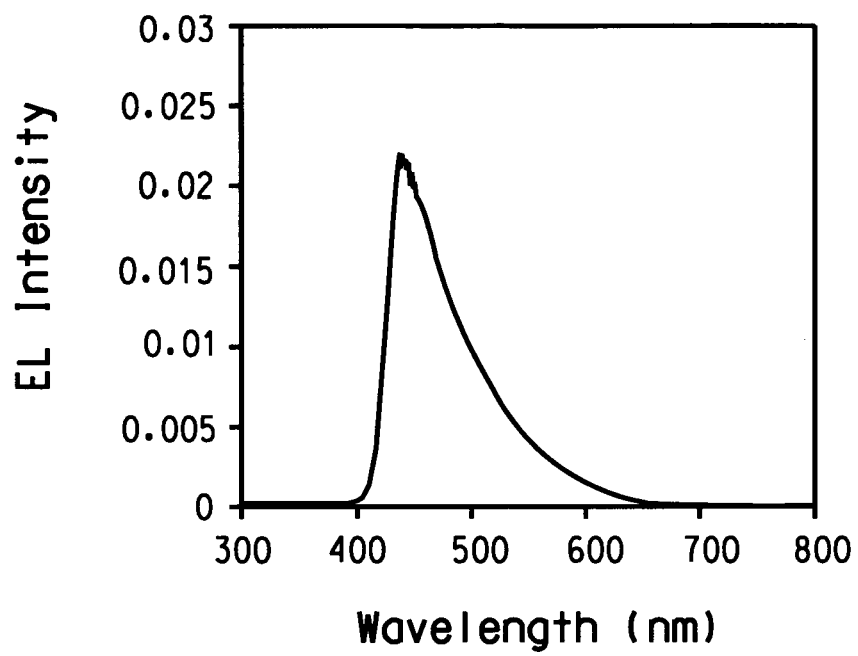
Figure 13:
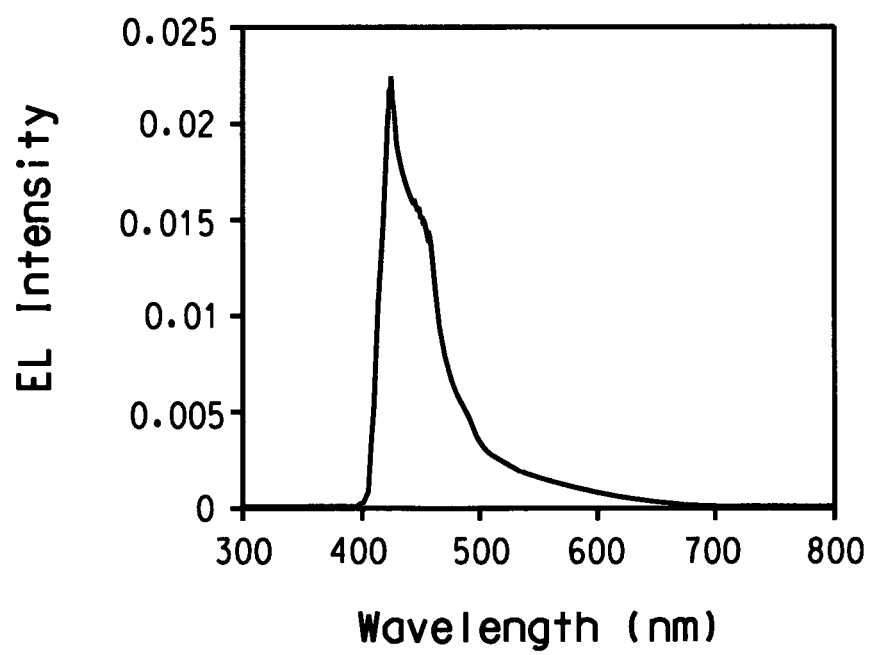
Figure 14:
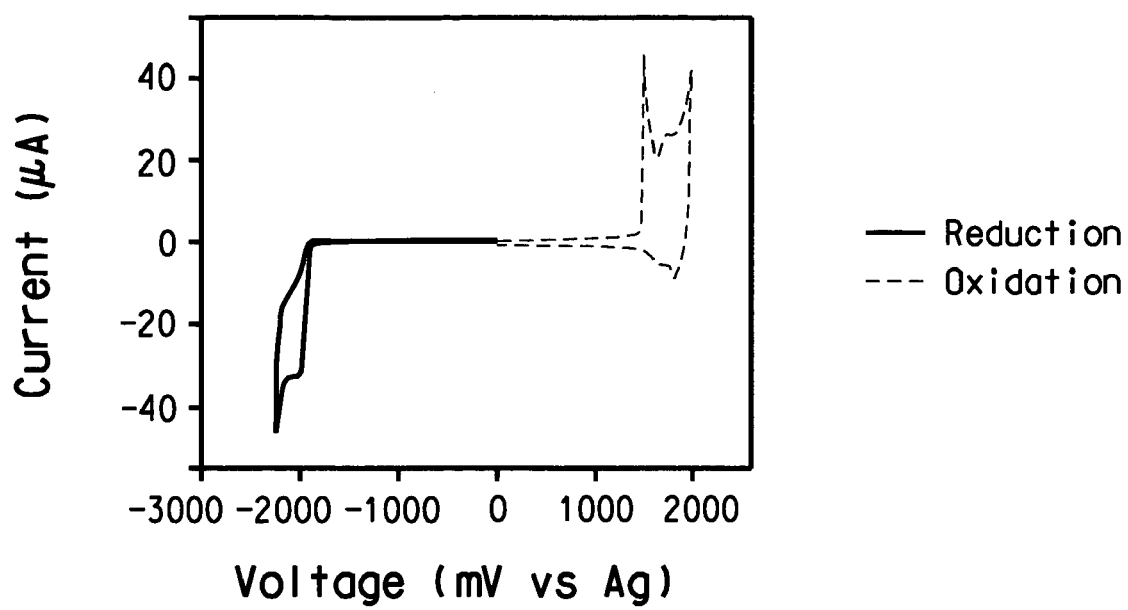
FIGS. 14–17 include plots showing cyclic voltammetry measurements for different copolymer materials.
Figure 15:
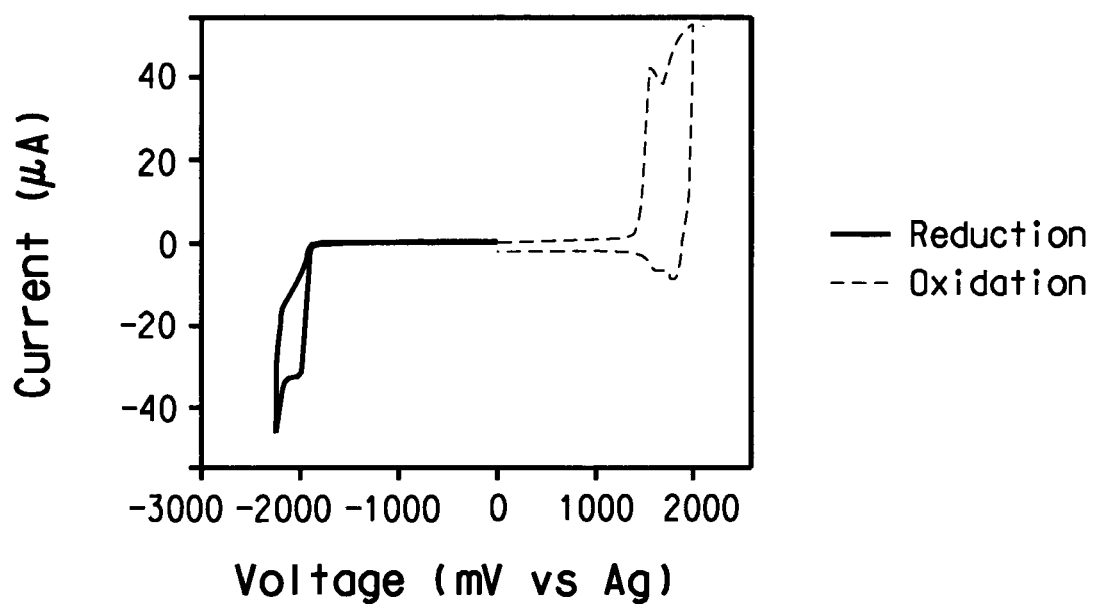
Figure 16:
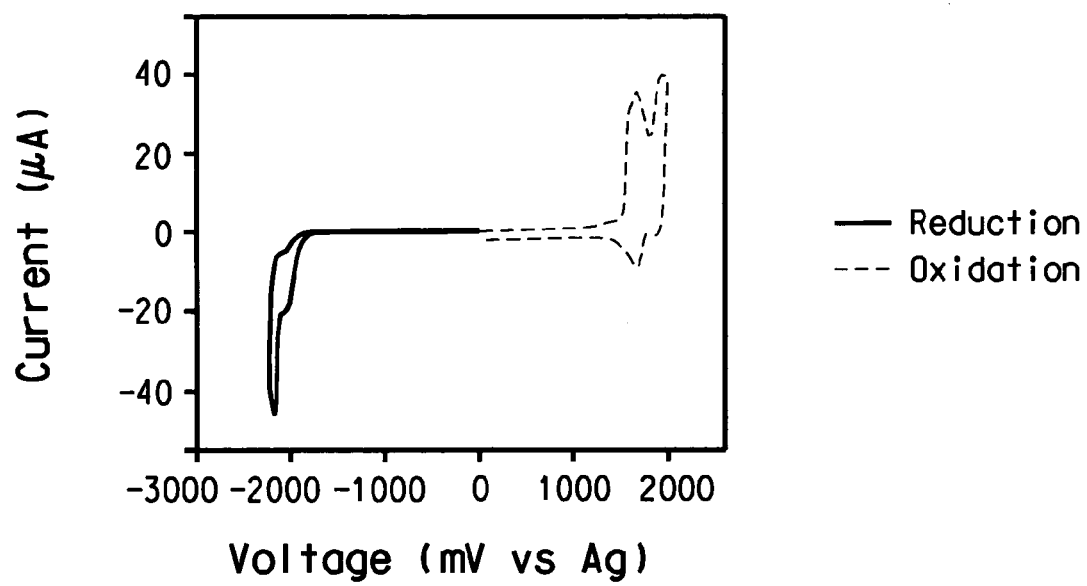
Figure 17:
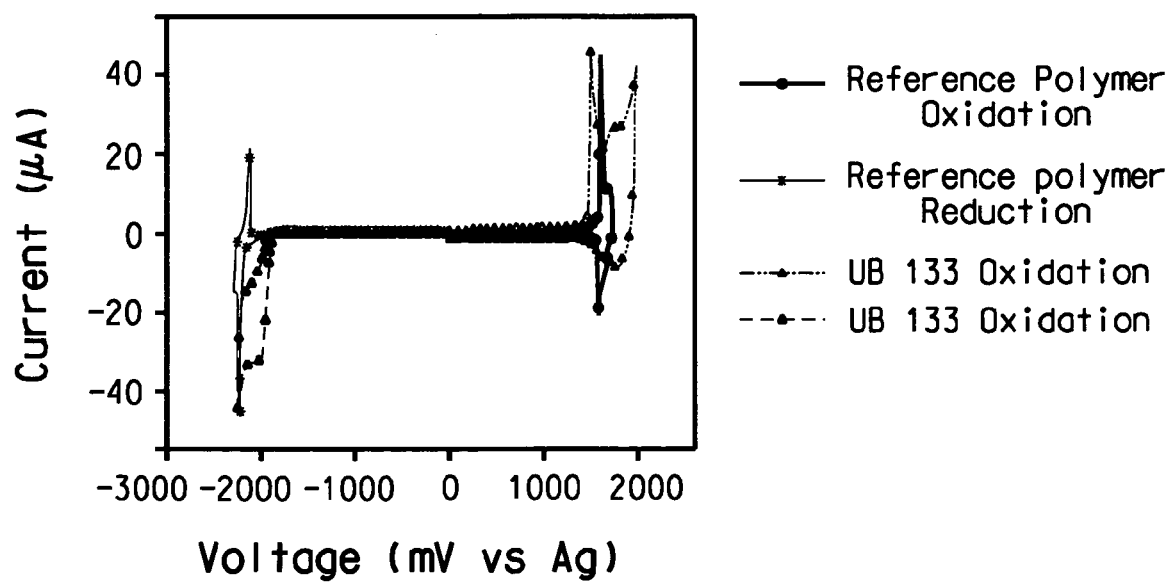

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

The energy levels (HOMO, LUMO) of the conjugated polymer are tuned independently, so that an energy match on both sides of the device can be accomplished while keeping the emission color in the blue region. Such polymers can be formed by polymerization of a mixture of monomers. The mixture of the monomers contains at least one of following monomers: "Monomer (I)" which has electron-deficient groups sandwiched by substituted aryl groups, hole transporting monomer (HT Monomer), solubility enhancement monomer (SE Monomer) and Branching Monomer. Such polymers can be used in fabricating light emitting diodes to achieve some of the best device performance to date including high efficiency and blue color purity.

Before addressing details of embodiments described below, some terms are defined or clarified. The term "alkyl" is intended to mean a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like.

The term "alkenyl" is intended to mean a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by another atom, such as nitrogen, oxygen, sulfur, and the like.

The term "alkynyl" is intended to mean a group derived from an aliphatic hydrocarbon having at least one carbon-carbon triple bond, and includes linear, branched and cyclic groups which may be unsubstituted or substituted. The term "heteroalkenyl" is intended to mean an alkynyl group, wherein one or more of the carbon atoms within the alkynyl group has been replaced by another atom, such as nitrogen, oxygen, sulfur, and the like.

The term "aryl" is intended to mean a group derived from an aromatic hydrocarbon which may be unsubstituted or substituted. The term "heteroaryl" in intended to mean an aryl group, wherein one or more of the carbon atoms within the aryl group has been replaced by another atom, such as nitrogen, oxygen, sulfur, and the like.

The term "arylalkyl" is intended to mean a group derived from an alkyl group having an aryl substituent. The point of attachment is on the aryl part of the group. The term "heteroarylalkyl" is intended to mean a group derived from an alkyl group having a heteraryl substituent. The point of attachement is on the heteroaryl part of the group.

The phrase "adjacent to," when used to refer to layers in a device, does not necessarily mean that one layer is immediately next to another layer.

The term "active" refers to any material that exhibits electroluminescence or other electro-radiative properties. The term "monomeric unit" refers to a repeating unit in a polymer.

The term "Branching Unit" is intended to mean a monomeric unit within a copolymer, where the monomeric unit has more than two linkage sites.

The term "copolymer" is intended to mean polymer having at least two different monomeric units.

The term "degree of polymerization" is intended to mean the total number of monomeric units in a polymer.

The term "functional group" is intended to mean a group which will react under polymerization conditions to form a polymer.

The term "hole-transport monomeric unit" (HT Unit) is intended to mean a monomeric unit within a copolymer, where the monomeric unit is easier to be oxidized or form a positive charge than other part of the polymer main chain.

The term "low work function material" is intended to mean a material having a work function no greater than about 4.4 eV. The term "high work function material" is intended to mean a material having a work function of at least approximately 4.4 eV.

The term "oxadiazole-type group" is intended to mean a group having an oxadiazole moiety.

The term "oxazole-type group" is intended to mean a group having an oxazole moiety, including benzoxazoles, benzobisoxazole and the like.

The term "polymer" is intended to mean a polymer having at least one repeating monomeric unit. The term "polymer" includes both homopolymers and copolymers.

The phrase "room temperature" is intended to mean a temperature in a range of approximately 20–25° C.

The terms "main chain polymer" or "main chain" are intended to mean a portion of the polymer having the longest portion of contiguous groups. The term "polymer side chain" or "side chain" is intended to mean a portion of the polymer not lying along the main polymer chain. Typically, other groups attached to main chain are polymer side chains.

The term "solubility enhancement monomeric unit" (SE Unit) is intended to mean a monomeric unit within a copolymer, where the monomeric unit has one or more side chains which further enhance the solubility of the polymer.

The term "spirofluorene" is intended to mean two fluorene groups attached at the 9-position. The term "9-position" refers to the carbon in fluorene given the number designation 9, according to IUPAC nomenclature.

The term "thiazole-type group" is intended to mean a group having a thiazole moiety, including benzothiazoles, benzobisthiazole and the like.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

Group numbers corresponding to columns within the periodic table of the elements use the "New Notation" convention as seen in the *CRC Handbook of Chemistry and Physics,* 81$^{st}$ Edition (2000–2001).

To the extent not described herein, many details regarding specific materials, processing acts, and circuits are conventional and may be found in textbooks and other sources within the organic light-emitting display, photodetector, photovoltaic, and semiconductor arts.

In Polymer (I) of the invention, the HOMO and LUMO energy levels can be adjusted independently, while the color can be kept substantially the same. The polymers can be formed using at least one Monomer (I) in which an electron-deficient group is sandwiched between two substituted aryl groups, at least one hole transporting monomer, and optionally a solubility enhancing monomer and/or a Branching Monomer.

Monomer (I) has Formula I below:

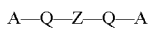 (I)

wherein:
A is selected from Cl, Br, I, and tosylate
Q is an aromatic group; and
Z is an electron deficient group.

In one embodiment, Q is an aromatic group with at least one substituent selected from alkyl, heteroalkyl, alkenyl, heteroalkenyl, alkynyl, heteroalkynyl, aryl, arylalkyl, heteroaryl, heteroarylalkyl, and NR', wherein R' is H or an alkyl.

Examples of suitable aromatic groups for Q include mono- and polycyclic aromatic hydrocarbons, such as fluorenes, spirofluorenes, phenyls, biphenyls, bridged biphenyls, naphthalenes, anthracenes, and the like. The aromatic group can be substituted at one or more positions, preferably two positions. The substituents are preferably alkyl groups having from 1 to 20 carbon atoms. Preferred groups for Q are fluorenes with two alkyl groups in the 9-position.

Examples of suitable electron deficient groups for Z include heteroaromatic groups having heteroatoms selected from O, N, and S, and fluorinated aromatic groups. Preferred groups for Z are oxazole-type, oxadiazole-type, thiazole-type, and fluorinated aromatic groups, such as phenyls and biphenyls.

A preferred Monomer (I) has the following Formula IV:

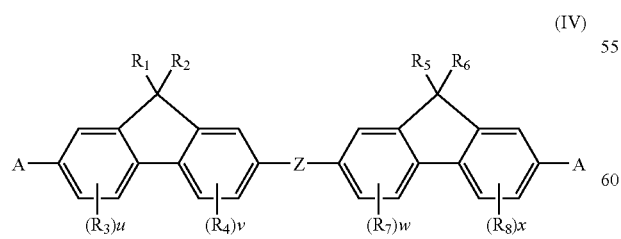

(IV)

where:
A is selected from Cl, Br, I, and tosylate; preferably A is Cl or Br;

Z is selected from:

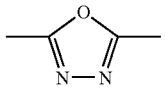

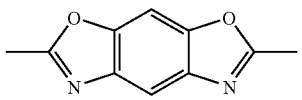

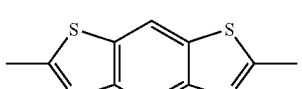

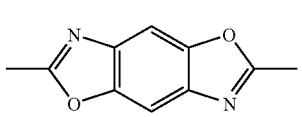

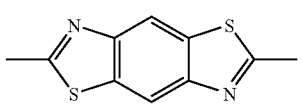

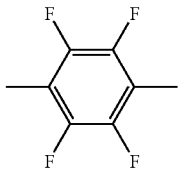

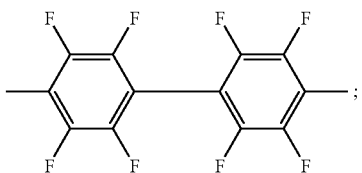;

R1–R8 are same or different and are selected from alkyl, heteroalkyl, alkenyl, heteroalkenyl, alkynyl, heteroalkynyl, aryl, arylalkyl, heteroaryl, heteroarylalkyl, and NR',
R' is H or an alkyl;
u, v, w, and x are numbers of substituents on the benzene rings and are same or different and each of u, v, w, and x is in a range of 0–3.

The HT Monomer is a monomer having an electron rich group. Examples of suitable HT Monomers include carbazoles, triarylamines, and aromatic groups having carbazole or triarylamine groups. Of particular interest as hole-transport monomers are the N-aryl carbazoles. Those with alkyl substituents may have better solubility and better processibility compared to other hole-transport monomers. Specific examples include:
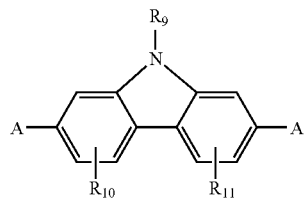
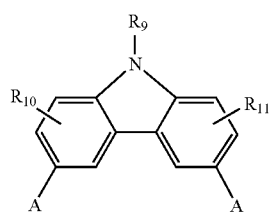
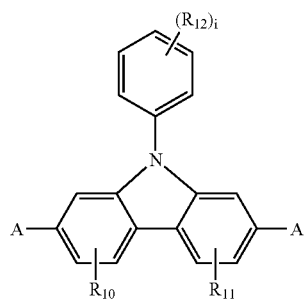
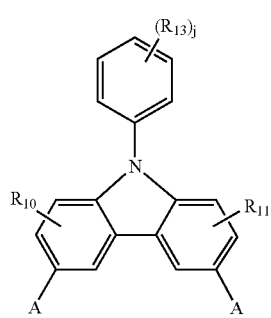
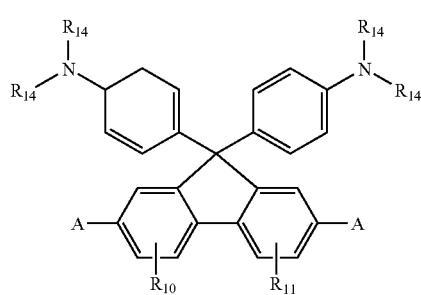
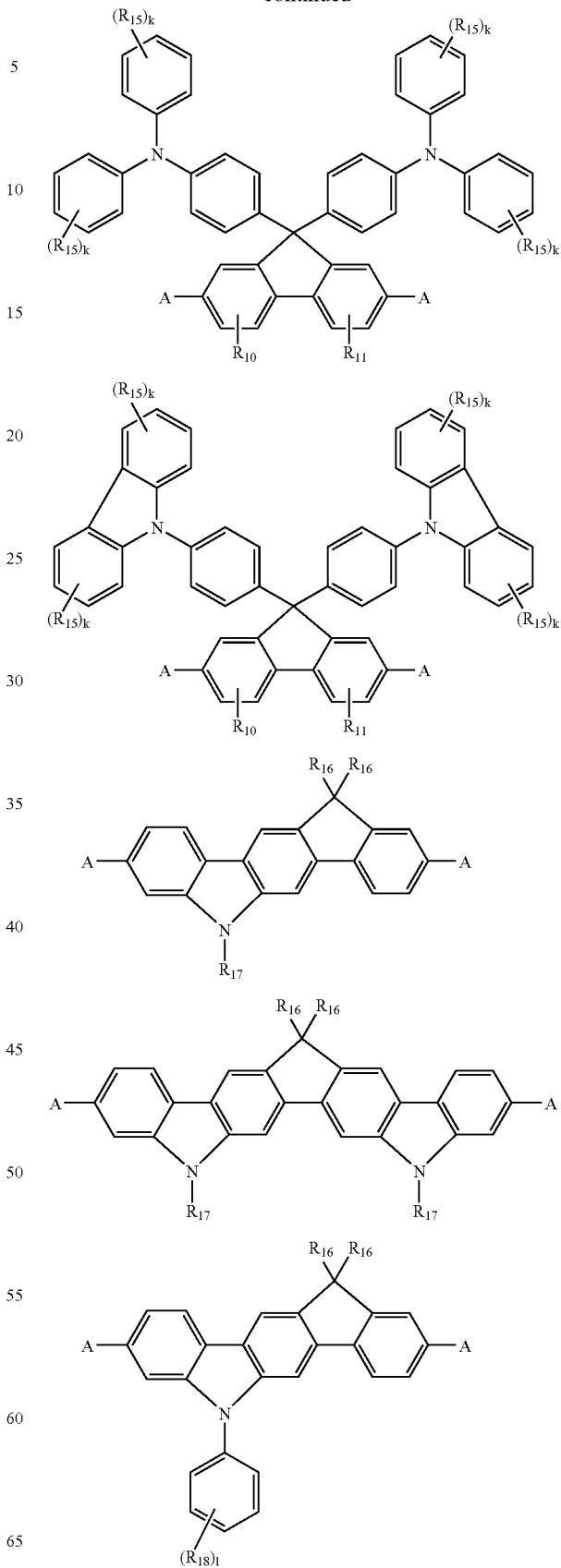

-continued

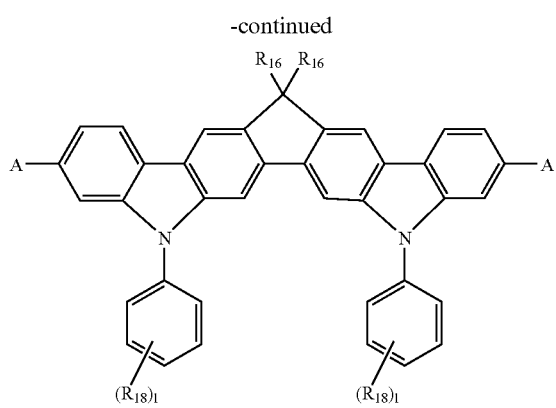

A is selected from Cl, Br, I, and tosylate; preferably A is Cl or Br.

$R_9$–$R_{18}$ are same or different and are selected from alkyl, heteroalkyl, alkenyl, heteroalkenyl, alkynyl, heteroalkynyl, aryl, arylalkyl, heteroaryl, heteroarylalkyl, and NR', R' is H or an alkyl;

i, j, k, l are numbers of substituents on the benzene rings and are same or different and each of i, j, k, and l is in a range of 0–3;

The SE Monomer is a substituted aromatic monomer. Examples of suitable monomers include substituted fluorenes, substituted phenyls, substituted biphenyls, and substituted bridged biphenyls. A preferred SE Monomer has Formula V below:

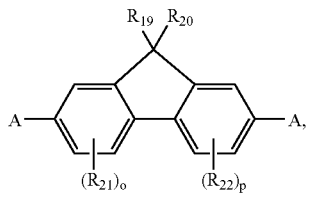

(V)

wherein

A is selected from Cl, Br, I, and tosylate; preferably A is Cl or Br;

R19–R22 are same or different and are selected from alkyl, heteroalkyl, alkenyl, heteroalkenyl, alkynyl, heteroalkynyl, aryl, arylalkyl, heteroaryl, heteroarylalkyl, and NR', R' is H or an alkyl; and o and p are numbers of substituents on the benzene rings and are same or different and each of o and p is in a range of 0–3.

The Branching Monomer is a monomer having more than two linkage sites. Examples of suitable Branching Monomers include:

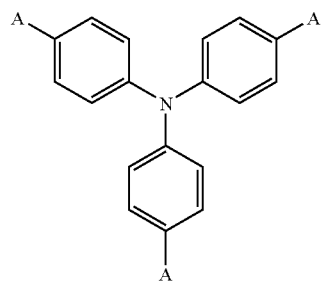

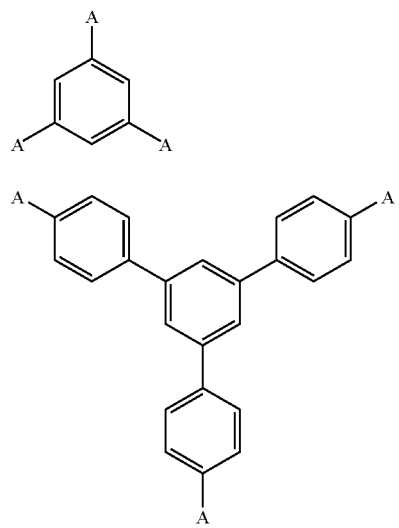

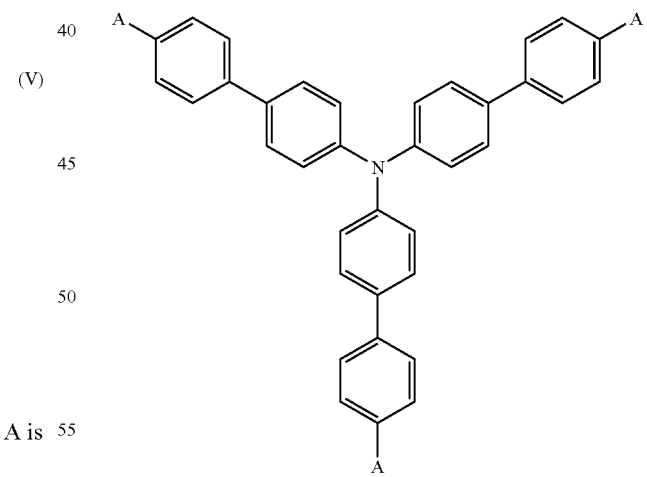

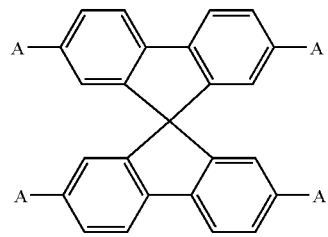

-continued

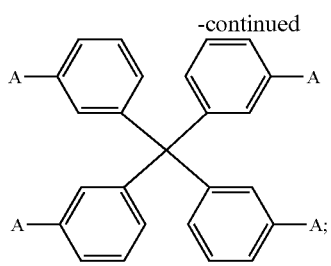

where:

A is selected from Cl, Br, I, and tosylate; preferably A is Cl or Br.

The resulting Polymer (I) has Formula II below:

$$\text{---(First Monomeric Unit)}_q\text{---(SE Unit)}_r\text{---(HT Unit)}_s\text{---(Branching Unit)}_t\text{---} \quad \text{(II)}$$

wherein:

the First Monomeric Unit has Formula III below:

$$\text{---Q---Z---Q---} \quad \text{(III)}$$

where Q and Z are as described above for Monomer (I);

the HT Unit is a monomeric unit having an electron rich group;

the SE Unit is a monomeric unit having substituted aromatic groups;

the Branching Unit is a monomeric unit having more than two linkage sites;

q is an integer; and r, s, and t are zero or an integer, with the proviso that at least one of r, s, and t is an integer.

The HT Unit is the monomeric unit resulting from the polymerization of the HT Monomer. The SE Unit is the monomeric unit resulting from the polymerization of the SE Monomer. The Branching Unit is the monomeric unit resulting from the polymerization of the Branching Monomer. Polymer I is a statistical copolymer. The values of q, r, s, and t result from the statistical distribution of monomers, such that the molar percentages of the monomeric units are:

| First monomer unit | 1–99 mol % |
|---|---|
| HT monomeric unit | 0–99 mol % |
| SE monomeric unit | 0–98 mol % |
| Branching Unit | 0–5 mol %. |

In one embodiment, the molar percentages of the monomeric units are:

| First monomer unit | 10–80 mol % |
|---|---|
| HT monomeric unit | 5–60 mol % |
| SE monomeric unit | 20–80 mol % |
| Branching Unit | 0.5–3 mol %. |

The degree of polymerization of Polymer (I) is greater than 10; preferably greater than 50; and most preferably greater than 100. The degree of polymerization can be 3000, or even higher, as long as the polymer is soluble or dispersible in solvents for coating without gelling, and can be formed into a film.

A preferred polymer has the structure of Formula V below:

$$\text{---(First Monomeric Unit)}_q\text{---(SE Unit)}_r\text{---(HT Unit)}_s\text{---(Branching Unit)}_t\text{---} \quad \text{(V)}$$

wherein:

the First Monomeric Unit has the structure of Formula III below:

(III)

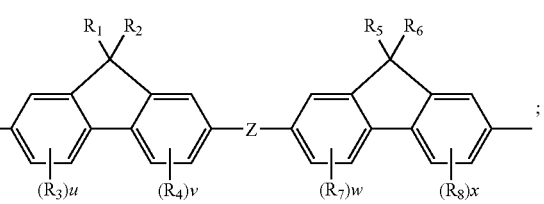

Z is selected from:

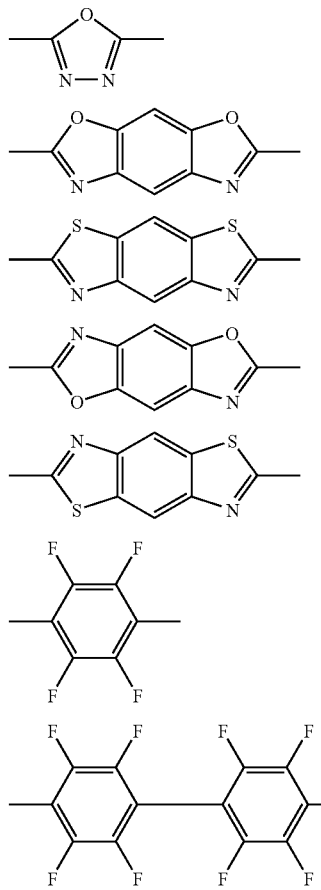

$R_1$–$R_8$ are same or different and are selected from alkyl, heteroalkyl, alkenyl, heteroalkenyl, alkynyl, heteroalkynyl, aryl, arylalkyl, heteroaryl, heteroarylalkyl, and NR', R' is H or an alkyl group;

u, v, w, and x are numbers of substituents on the benzene rings and are same or different and each of u, v, w, and x is in a range of 0–3;
the HT Unit is selected from:
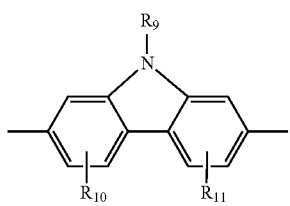
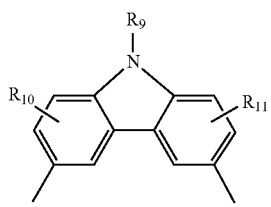
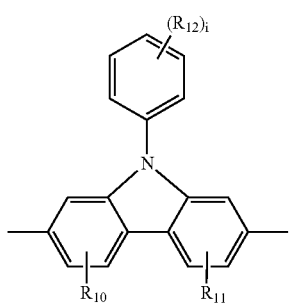
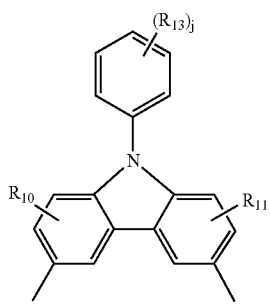
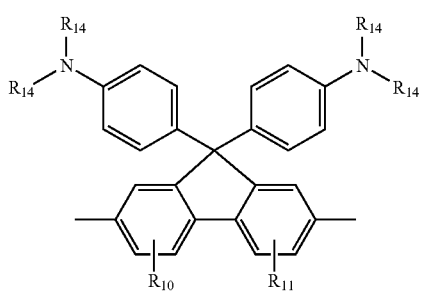
-continued
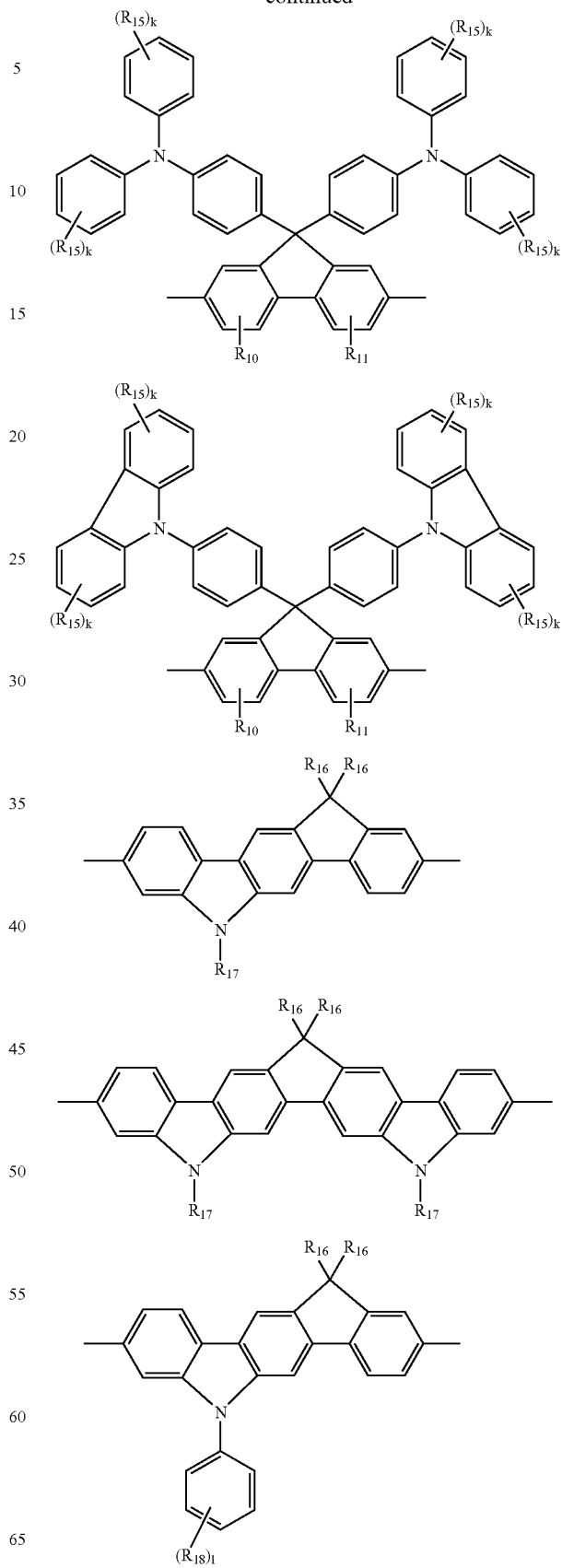

-continued

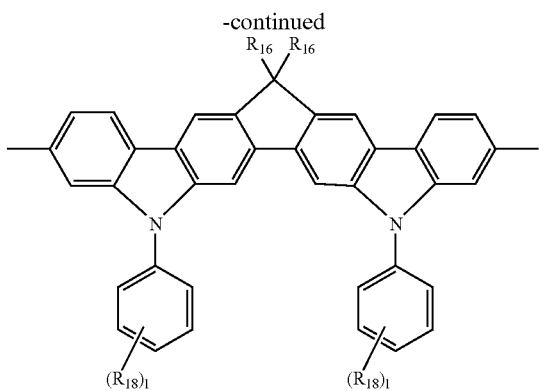

$R_9$–$R_{18}$ are same or different and are selected from alkyl, heteroalkyl, alkenyl, heteroalkenyl, alkynyl, heteroalkynyl, aryl, arylalkyl, heteroaryl, heteroarylalkyl, and NR', R' is H or an alkyl;

i, j, k, l are numbers of substituents on the benzene rings and are same or different and each of u, v, w, and x is in a range of 0–3;

the SE Unit is selected from:

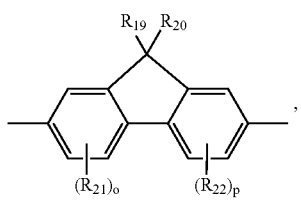

wherein:

R19–R22 are same or different and are selected from alkyl, heteroalkyl, alkenyl, heteroalkenyl, alkynyl, heteroalkynyl, aryl, arylalkyl, heteroaryl, heteroarylalkyl, and NR', R' is H or an alkyl;

o and p are numbers of substituents on the benzene rings and are same or different and each of u, v, w, and x is in a range of 0–3;

the Branching Unit is selected from:

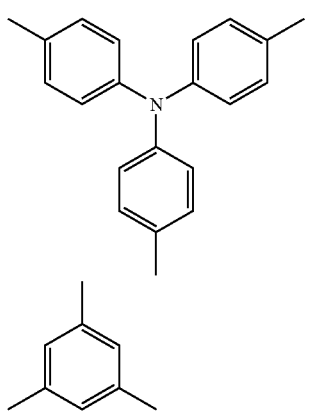

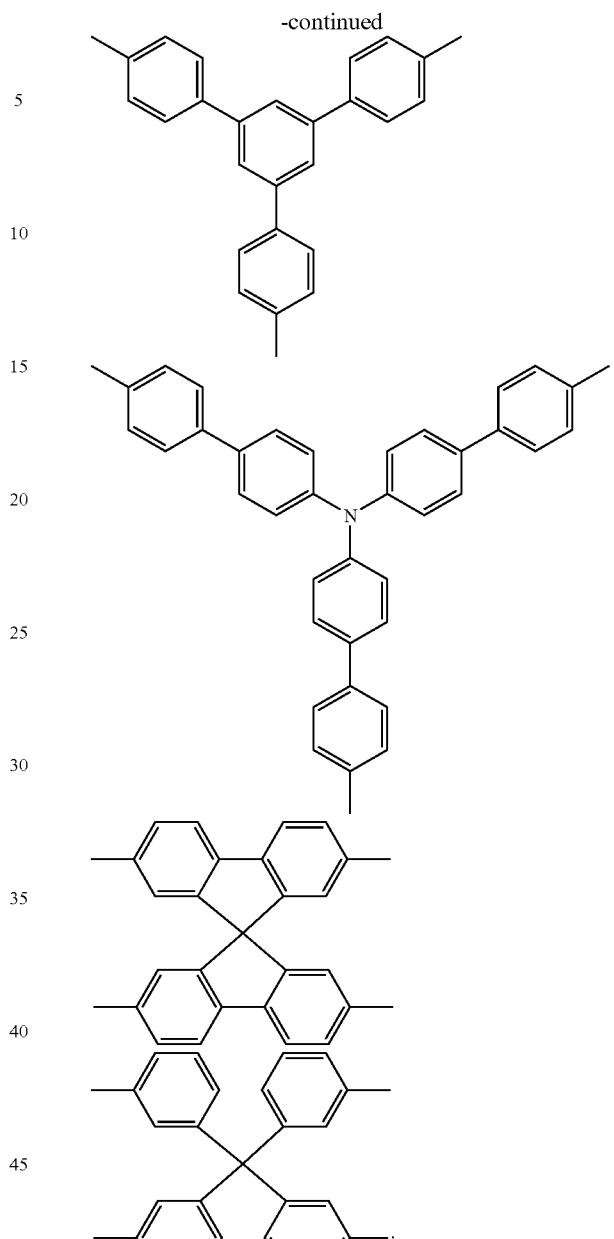

q is an integer;

r, s, and t are 0 or integers, with the proviso that at least one of r, s, and t is an integer.

There are several beneficial effects of having the electron-deficient (electron-transport) group isolated from the other groups by aryl groups in the First Monomer Unit. When electron-rich and electron-deficient groups are directly linked, their electronic properties can be averaged and thus be less effective. In Polymer (I), the electron-deficient group is separated from the electron-rich monomeric unit by at least one aryl group. If there are additional alkyl groups on the aromatic Q group, a higher density of additional monomers can be incorporated into the polymer due to the solubilizing effect of the substituted aryl group. In addition, having the coupling position moved away from the electron-deficient center can result in a higher degree of polymerization. This is particularly true for Yamamoto coupling, discussed below. The presence of the substituted aryl groups also results in copolymers which form good quality thin films.

An important and unexpected finding of the present work, is the fact that the polymerization of dichloro-functionalized monomers under Yamamoto conditions (Ni(0)-induced) yields high-molecular weight polymers. In some cases, the polymerization of dichloro monomers resulted in even higher molecular weight polymers than the polymers made from the corresponding dibromo derivative. This discovery dramatically increases the number of aromatic compounds (including those that are commercially available) that can be used as monomers for preparing conjugated polymers and opens up new opportunities for the design of novel monomers. Thus, it is possible to use the unsymmetric substituted 2-bromo-7-chloro-9,9-dialkyl-9H-fluorene as a building block for the synthesis of larger, more complex monomer structures. The bromo-function of the fluorene compound can be coupled with boronic acid/or -ester substituted aromatic systems under Pd (0)-catalyzed conditions (Suzuki). The chloro group of the fluorene will not be attacked under these conditions, and can be used as a functional group for the polymerization.

The Yamamoto polymerization process can be used with other dichloroaromatic monomers to prepare polymers having a degree of polymerization of 20 and greater. In one embodiment, it can be used to form polymers having a degree of polymerization of 100 and greater.

Attention is now directed to preparation and synthesis of the polymers. The description below includes some generic details regarding the formation of monomers and using those monomers to form copolymers. Later in this specification, specific examples are given to better illustrate and not limit the invention.

Monomer (I) contains an electron-deficient group "Z" and two substituted aryl groups attached to it. The functional group on the substituted aryl group which can be used as polymerization site ("A") can be bromo, chloro, iodo, or tosylate.

Two approaches to form Monomer (I) may be used and include (1) a condensation reaction and ring closure and (2) Suzuki coupling. Note that other approaches could also be used.

(1) Condensation reaction and ring closure is illustrated below for a monomer having fluorene as the aryl group.

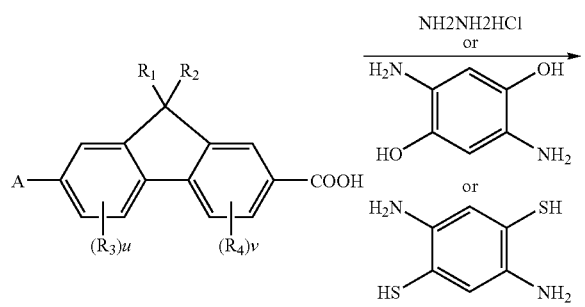

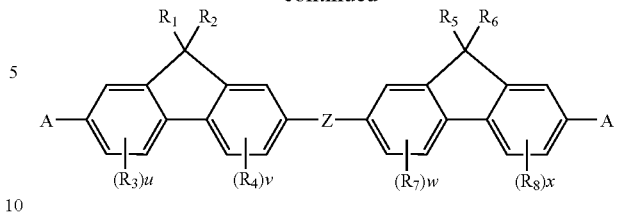

Two equivalents of fluorenecarboxylic acid can be coupled with one equivalent of a condensation reagent. In this approach, the electron-deficient group Z can be formed in the process of the condensation reaction and subsequent ring closure. Fluorenecarboxylic acid can be obtained by known procedures.

(2) Suzuki coupling is illustrated below for a monomer having fluorene as the aryl group.

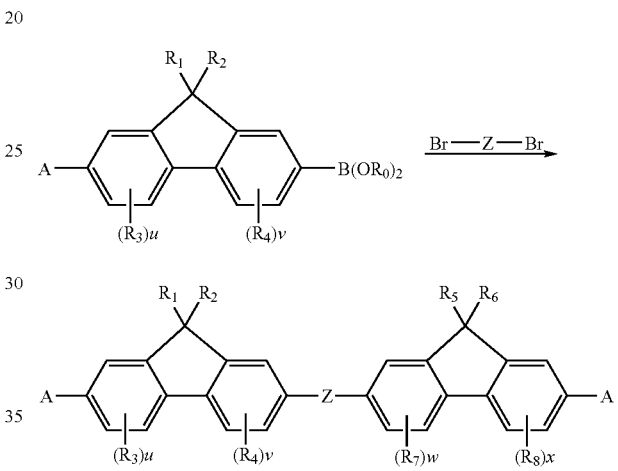

Two equivalents of a boronic acid or a boronic ester are coupled with one equivalent of a dibromo substituted aromatic compound which is electron-deficient. The boronic acid or ester can be easily obtained by converting a corresponding bromofluorene using a conventional method. Note that the two equivalents of the boronic acid or boronic ester may be of the same acid or ester or different boronic acids or boronic esters. In still another embodiment, one equivalent each of a boronic acid and a boronic ester may be used.

The polymers can be prepared by Yamamoto polymerization. In this process, the monomers having Cl, Br, I, or toslyate functional groups, are added to a solution of a Ni(0) compound in an inert solvent. Typically, a nickel (0) cyclooctadiene complex is used in the presence of a 2,2'-bipyridine, in a solvent such as DMF. The reaction is generally carried out at temperatures in the range of 60–80° C., and the resulting polymers isolated using known techniques, such as precipitation. The polymerization is described in more detail in the examples that are presented later in this specification. In one embodiment, the polymerization is carried out using the dichloro First Monomer and the dichloro HT Monomer.

Energy level measurements for HOMO and LUMO and other characterizations were performed on some of the resulting polymers. The onset potential of p-doping (oxidation) and n-doping (reduction) in cyclic voltammetry can be used to determine the energy level of HOMO and LUMO. In one conventional technique, the energy levels (in electron volts, eV) can be approximated by measuring the electrochemical potentials vs a reference electrode. When a saturated calomel electrode ("SCE") is used as the reference electrode, it is assumed that it has a vacuum energy level of 4.4 eV. The energy levels are then approximated by adding 4.4 eV to the corresponding electrochemical potentials as measured vs. SCE. FIGS. 2–17 include plots of electrical characteristics and cyclic voltammetry measurements of some of the polymers formed as described in the examples section of this specification.

The molecular weight and molecular weight distribution can be used to characterize a polymer sample. Gel permeation chromatography ("GPC"), more correctly termed "size exclusion chromatography," can be used for characterization of molecular weight and distribution of molecular weight in the polymers.

The polymers formed can be used in electronic devices. The polymers may be used as part of an organic active layer, hole-transport layer, or electron-transport layer in an organic light-emitting diode ("OLED") of a display. When used in OLEDs, some of the best device performances to date including high efficiency and blue color purity have been achieved.

As shown in FIG. 1, a typical device may have an anode layer 110, a cathode layer 150 and an active layer 130. Adjacent to the anode layer 110 is an optional hole-injecting/transport layer 120. Adjacent to the cathode layer 150 is an optional electron-injection/transport layer 140. Between the hole-injection/transport layer 120 and the cathode layer 150 (or optional electron-injection/transport layer 140) is the active layer 130. The polymers described above may be used in the hole-injection/transport layer 120, the active layer 130, the optional electron-injection/transport layer 140, or any combination thereof.

The device may include a support or substrate (not shown) that can be adjacent to the anode layer 110 or the cathode layer 150. Most frequently, the support is adjacent the anode layer 110. The support can be flexible or rigid, organic or inorganic. Generally, glass or flexible organic films are used as a support. The anode layer 110 is an electrode that is more efficient for injecting holes compared to the cathode layer 150. The anode can include materials containing a metal, mixed metal, alloy, metal oxide or mixed-metal oxide. Suitable metals include the Group 11 metals, the metals in Groups 4, 5, and 6, and the Group 8–10 transition metals. If the anode layer 110 is to be light transmitting, mixed-metal oxides of Groups 12, 13 and 14 metals, such as indium-tin-oxide, may be used. Some non-limiting, specific examples of materials for anode layer 110 include indium-tin-oxide ("ITO"), aluminum-tin-oxide, gold, silver, copper, nickel, and selenium. The anode may also comprise an organic material such as polyaniline.

The anode layer 110 may be formed by a chemical or physical vapor deposition process or spin-cast process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as e-beam evaporation and resistance evaporation. Specific forms of physical vapor deposition include rf magnetron sputtering or inductively-coupled plasma physical vapor deposition ("IMP-PVD"). These deposition techniques are well known within the semiconductor fabrication arts.

The polymers described above and in the examples section may function as hole-transport materials in layer 120. Other materials which may facilitate hole-injection/transport comprise N,N'-diphenyl-N,N'-bis(3-methylphenyl)-[1,1'-biphenyl]-4,4'-diamine (TPD) and bis[4-(N,N-diethylamino)-2-methylphenyl](4-methylphenyl)methane (MPMP); hole-transport polymers such as polyvinylcarbazole (PVK), (phenylmethyl)polysilane, poly(3,4-ethylenedioxythiophene) (PEDOT), and polyaniline (PANI), or the like; electron and hole-transporting materials such as 4,4'-N,N'-dicarbazole biphenyl (BCP); or light-emitting materials with good hole-transport properties such as chelated oxinoid compounds, including tris(8-hydroxyquinolato)aluminum (Alq$_3$) or the like. In some embodiments, if the conductivity of the hole-injection/transport layer 120 can be made similar to anode layer 110, the anode layer 110 may not be required and the hole-injection/transport layer 120 can act as the anode for the electronic device.

The hole-injection/transport layer 120 can be formed using any conventional means, including spin-coating, casting, and printing, such as gravure printing. The layer can also be applied by ink jet printing, thermal patterning, or chemical or physical vapor deposition.

Usually, the anode layer 110 and the hole-injection/transport layer 120 are patterned during the same lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used. When the electronic devices are located within an array, the anode layer 110 and hole-injection/transport layer 120 typically are formed into substantially parallel strips having lengths that extend in substantially the same direction.

The polymer described above and in the examples may function as active material described later in this specification. The active layer 130 containing the active organic material can be applied from solutions by any conventional technique, including spin-coating, casting, and printing.

Optional layer 140 can function both to facilitate electron-injection/transport, and also serve as a buffer layer or confinement layer to prevent quenching reactions at layer interfaces. More specifically, layer 140 may promote electron mobility and reduce the likelihood of a quenching reaction if layers 130 and 150 would otherwise be in direct contact.

The polymers described earlier and within the examples section may function as electron-transport materials. Other materials which may facilitate hole-injection/transport comprise metal-chelated oxinoid compounds (e.g., Alq$_3$ or the like); phenanthroline-based compounds (e.g., 2,9-dimethyl-4,7-diphenyl-1,10-phenanthroline ("DDPA"), 4,7-diphenyl-1,10-phenanthroline ("DPA"), or the like); azole compounds (e.g., 2-(4-biphenylyl)-5-(4-t-butylphenyl)-1,3,4-oxadiazole ("PBD" or the like), 3-(4-biphenylyl)-4-phenyl-5-(4-t-butylphenyl)-1,2,4-triazole ("TAZ" or the like); other similar compounds; or any one or more combinations thereof. Alternatively, optional layer 140 may be inorganic and comprise BaO, LiF, Li$_2$O, or the like.

The electron-injection/transport layer 140 can be formed using any conventional means, including spin-coating, casting, and printing. The layer can also be applied by ink jet printing, thermal patterning, or chemical or physical vapor deposition.

The cathode layer 150 is an electrode that is particularly efficient for injecting electrons or negative charge carriers. The cathode layer 150 can be any metal or nonmetal having a lower work function than the first electrical contact layer (in this case, the anode layer 110). Materials for the second electrical contact layer can be selected from alkali metals of Group 1 (e.g., Li, Na, K, Rb, Cs,), the Group 2 (alkaline earth) metals, the Group 12 metals, the rare earths, the lanthanides (e.g., Ce, Sm, Eu, or the like), and the actinides. Materials such as aluminum, indium, calcium, barium, yttrium, and magnesium, and combinations, may also be used. Specific non-limiting examples of materials for the cathode layer 150 include barium, lithium, cerium, cesium, europium, rubidium, yttrium, magnesium, and samarium.

The cathode layer 150 is usually formed by a chemical or physical vapor deposition process. In general, the cathode layer will be patterned, as discussed above in reference to the anode layer 110 and optional conductive polymer layer 120. If the device lies within an array, the cathode layer 150 may be patterned into substantially parallel strips, where the lengths of the cathode layer strips extend in substantially the same direction and substantially perpendicular to the lengths of the anode layer strips. Electronic elements called pixels are formed at the cross points (where an anode layer strip intersects a cathode layer strip when the array is seen from a plan or top view).

In other embodiments, additional layer(s) may be present within organic electronic devices. For example, a layer (not shown) between the conductive polymer layer 120 and the active layer 130 may facilitate positive charge transport, band-gap matching of the layers, function as a protective layer, or the like. Similarly, additional layers (not shown) between the active layer 130 and the cathode layer 150 may facilitate negative charge transport, band-gap matching between the layers, function as a protective layer, or the like. Layers that are known in the art can be used. In addition, any of the above-described layers can be made of two or more layers. Alternatively, some or all of inorganic anode layer 110, the conductive polymer layer 120, the active layer 130, and cathode layer 150, may be surface treated to increase charge carrier transport efficiency. The choice of materials for each of the component layers may be determined by balancing the goals of providing a device with high device efficiency with the cost of manufacturing, manufacturing complexities, or potentially other factors.

Although not meant to limit, the different layers may have the following range of thicknesses: inorganic anode layer 110, usually no greater than approximately 500 nm, for example, approximately 10–200 nm; conductive polymer layer 120, usually no greater than approximately 250 nm, for example, approximately 20–200 nm; active layer 130, usually no greater than approximately 1000 nm, for example, approximately 10–80 nm; optional layer 140, usually no greater than approximately 100 nm, for example, approximately 20–80 nm; and cathode layer 150, usually no greater than approximately 100 nm, for example, approximately 30–500 nm. If the anode layer 110 or the cathode layer 150 needs to transmit at least some light, the thickness of such layer may not exceed approximately 100 nm.

In polymer light emitting diodes, electrons and holes, injected from the cathode 150 and anode 110 layers, respectively into the active polymer layer 130, form negative and positively charged polarons in the polymer. These polarons migrate under the influence of the applied electric field, forming a polaron exciton with an oppositely charged species and subsequently undergoing radiative recombination. A sufficient potential difference between the anode and cathode, usually less than approximately 12 volts, and in many instances no greater than approximately 5 volts, may be applied to the device. The actual potential difference may depend on the use of the device in a larger electronic component. In many embodiments, the anode layer 110 is biased to a positive voltage and the cathode layer 150 is at substantially ground potential or zero volts during the operation of the electronic device. A battery or other power source(s) may be electrically connected to the electronic device as part of a circuit but is not illustrated in FIG. 1.

The examples below serve to illustrate embodiments of the invention in greater detail. The following abbreviations are used within the examples.

cd/m2=candela per square meter.
$M_n$=number average molecular weight.
$M_w$=weight average molecular weight.
PD=polydispersity ($M_w/M_n$) as determined by GPC.

EXAMPLES

The first set of examples (Examples 1–22) includes descriptions related to preparing precursors for monomers, monomers, and polymers. The second set of examples includes the device fabrication and device performance using polymers (Examples 23–40). The third set of examples (Examples 41–44) includes the measurements of cyclic voltammetry which are used to determine the HOMO and LUMO energy level of polymers.

Example 1

The following example is used to exemplify the synthesis of 9,9-bis(2'-ethylhexyl)-2,7-dibromofluorene. The compound has the following structure:

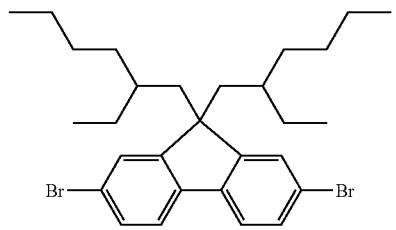

To a stirred mixture of 2,7-dibromofluorene (60 g or 185.2 mmol) and dimethylsulfoxide (DMSO) (approximately 600 mL) under $N_2$ were added catalytic amounts of benzyltriethylammonium chloride (approximately 0.46 g or 2.0 mmol) and aqueous NaOH solution (nominally 50 weight % and approximately 300 mL). 2-Ethylhexyl bromide (approximately 75 g or 390 mmol) was added drop wise and the mixture was agitated well at approximately 60° C. for approximately 2 hours. Water and ethyl acetate (approximately 300 ml each) were added to the reaction mixture and stirred for approximately 15 minutes. The organic layer was separated, washed with water, and then dried over $MgSO_4$. After removing the solvent, the product was purified by silica gel column chromatography and eluted by hexanes to afford the product as pale yellow oil. The yield was approximately 73 g (73%).

$^1$H-NMR (500 MHz, $CDCl_3$)δ ppm: 7.51 (d, J=8.5 Hz, 2H, H-fluorene), 7.48 (d, 2H, J=5 Hz, H-fluorene ), 7.44 (d, J=8 Hz, 2H, H-fluorene), 1.94 (m, 4H, methylenel), 0.64–0.98 (m, 22H, H-alkyl), 0.45–0.56 (m, 8H, H-alkyl). $^{13}$C-NMR (125 MHz, $CDCl_3$) δ ppm: aromatic, 152.61, 139.40, 130.31, 127.62, 121.26, 121.15, aliphatic, 55.58, 44.54, 34.90, 33.83, 28.25, 27.27, 22.93, 14.24, 10.52.

Example 2

The following example is used to exemplify the synthesis of 9,9-bis(2'-ethylhexyl)-2-bromo-7-fluorenecarboxylic acid. The compound has the following structure.

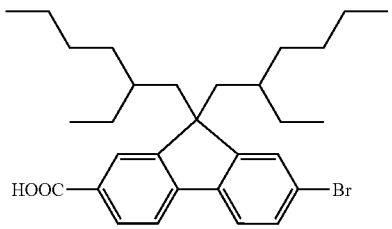

A solution of 9,9-bis-(2'-ethylhexyl)-2,7-dibromofluorene (approximately 50 g or 91 mmol) in approximately 250 ml anhydrous tetrahydrafuran (THF) was cooled down in a dry ice/acetone bath, to which a solution of tert-butyllithium in pentane (approximately 1.7 M or 60 ml) was added drop wise. After addition, the temperature of the reaction mixture was allowed to recover to room temperature and the mixture was stirred for additional 10 minutes. The mixture was then cooled down again in a dry ice/acetone bath and bubbled with dry carbon dioxide for approximately one hour. Carbon dioxide bubbling was continued for another three hours after the temperature of the mixture had recovered to about room temperature. Hydrochloric acid (approximately 18% and approximately 300 ml) was added to the mixture, and the mixture was extracted using ethyl acetate (2×approximately 200 ml). The combined organic layers were dried over $MgSO_4$ and the solvent was evaporated. Purification of the crude product was performed using a silica gel column. First, pure hexane was used as an eluent to recover 9,9-bis(2'-ethylhexyl)-2,7-dibromofluorene, then a mixture of hexane/THF=5/1 was used as an eluent to obtain the product. The yield was approximately 33 g (70.6%).

$^1$H-NMR (500 MHz, $CDCl_3$) δ ppm: 8.15 (s, 1H, H-fluorene), 8.14 (s, 1H, H-fluorene), 7.76 (d, J=10 Hz, 1H, H-fluorene), 7.64 (d, J=10 Hz, 1H, H-fluorene), 7.57 (td, J=5 Hz, J=2 Hz, 1H, H-fluorene), 7.51 (dd, J=10 Hz, J=1.5 Hz, H-fluorene), 1.97–2.07(m, 4H, methylene), 0.40–1.0 (m, 30H, methyl, methylene and methylidyne). $^{13}$C-NMR (125 MHz, $CDCl_3$) δ ppm: aromatic, 154.19, 150.58, 145.93, 139.11, 130.50, 129.86, 127.90, 127.62, 126.12, 122.43, 122.21, 119.82, aliphatic, 55.55, 44.47, 34.96, 33.87, 28.21, 27.30, 22.90, 14.15, 10.51.

Example 3

The following example is used to exemplify the synthesis of 2,5-bis-(7-bromo-9,9-bis(2'-ethylhexyl)-9H-fluoren-2-yl)-1,3,4-oxadiazole. The compound has the following structure.

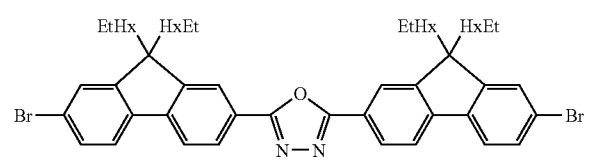

To a solution of phosphorus pentoxide (approximately 3.0 g) in approximately 50 ml methane sulfuric acid, was added a mixture of 2-bromo-9,9-bis-(2'-ethylhexyl)-7-carboxylic acid (approximately 3.3 g or 6.5 mmol) and hydrazine hydrochloride (approximately 220 mg or 3.3 mmol). The mixture was heated to approximately 100° C. and stirred under nitrogen for approximately one hour. After cooled down, the reaction mixture was poured into approximately 500 ml water. The crude product was precipitated out and isolated by filtration. Purification by recrystallization from hexane afforded yield of approximately 67%.

$^1$H-NMR (500 MHz, $CDCl_3$) δ ppm: 8.21 (s, 2H, H-fluorene), 8.17 (dd, J=8 Hz, J=1 Hz, 2H, H-fluorene), 7.86 (s, 2H, H-fluorene), 7.66 (d, J=8 Hz, 2H, H-fluorene), 7.61(d, J=6 Hz, 2H, H-fluorene), 7.53 (d, J=8 Hz, 2H, H-fluorene), 2.1(m, 4H, methylene), 0.5–1.0(m, 60H, methyl, methylene, methylidyne) $^{13}$C-NMR(125 MHz, $CDCl_3$) δ ppm: aromatic, 165.14, 153.68, 153.35, 143.92, 139.18, 130.50, 127.85, 126.35, 122.70, 122.43, 122.15, 121.88, 120.48, aliphatic, 55.67, 44.60, 34.99, 33.80, 28.23, 27.34, 22.90, 14.20, 10.50.

Example 4

The following example is used to exemplify the synthesis of bromochlorofluorene. The compound has the following structure.

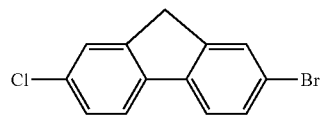

To a mechanically stirred slurry of bromofluorene (approximately 50 g or 0.20 mol) and N-chlorosuccinimide (approximately 33 g or 0.25 mol) in acetonitrile (approximately 100 ml) was added concentrated hydrochloric acid (approximately 11 ml or 0.26 mol). An exothermic reaction occurred during the addition of the HCl and cooling with a water bath was required to keep the temperature below the boiling point of acetonitrile. During the HCl addition, solution became clear and homogenous. After about one third of the HCl was added, the temperature began to drop, and the product began to precipitate out. The solution was stirred overnight (i.e., for several hours), and filtered and affording approximately 54 g white solid (yield approximately 94%). Recrystallization from isopropanol (using about 15 ml per gram of crude product) afforded approximately 41 g as a white crystal.

$^1$H-NMR (500 MHz, $CDCl_3$) δ ppm: 7.65 (d, J=1 Hz, 1H, H-fluorene), 7.63 (d, J=8 Hz, 1H, H-fluorene), 7.57 (d, J=8 Hz, J=1 Hz, 1H, H-fluorene), 7.63 (d, J=8 Hz, 1H, H-fluorene), 7.57 (d, J=8 Hz, H-fluorene), 7.50 (dd, J=6 Hz, J=2 Hz, 1H, H-fluorene), 7.49 (s, H-fluorene), 7.35 (dd, J=8 Hz, J=2 Hz, H-fluorene), 3.83 (s, 2H, methylene) $^{13}$C-NMR (125 MHz, $CDCl_3$) δ ppm: aromatic, 145.09, 144.65, 139.85, 139.43, 133.06, 131.14, 130.31, 128.50, 127.49, 125.55, 121.32, 120.99, Aliphatic, 36.77

Example 5

The following example is used to exemplify the synthesis of 9,9-bis(2'-ethylhexyl)-2-bromo-7-chloro-fluorene. The compound has the following structure.

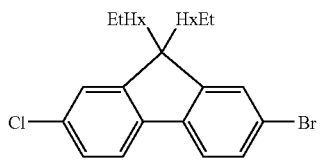

Bromochlorofluorene (approximately 36 g, 0.13 mol) was added to a mixture of KOH (nominally 50 weight percent aqueous solution and approximately 240 ml), toluene (approximately 150 ml) and Aliquat-336 (approximately 1.5 ml) at approximately 85° C. in a three neck flask fitted with a condenser, nitrogen purge, and magnetic stirring. The ethylhexyl bromide (approximately 55 g or 0.27 mol) was added dropwise via an additional funnel. The suspension was heated at approximately 85° C. overnight with stirring. The next day the reaction mixture was allowed to cool to approximately room temperature. Methylene chloride (approximately 300 ml) was then added to the reaction mixture. The mixture was then transferred to a separation funnel where the organic layer was removed. The aqueous layer was extracted with methylene chloride (3×approximately 10 ml). The combined organic phases are dried over $MgSO_4$, filtered and evaporated to remove the solvents. Kugelrohr distillation (approximately 210–220° C. at approximately 60 millitorr) and then chromatography column clean up (silica gel, hexane as an eluent) afforded approximately 53 g product as a viscous yellowish liquid. Yield was approximately 81%.

$^1$H-NMR (500 MHz, $CDCl_3$) δ ppm: 7.58 (d, J=8 Hz, 1H, H-fluorene), 7.49–7.53 (m, 2H, H-fluorene), 7.46 (dd, J=8 Hz, J=4 Hz, 1H, H-fluorene), 7.34 (td, J=6 Hz, J=2 Hz, 1H, H-fluorene), 7.31 (dd, J=8 Hz, J=2 Hz, 1H, H-fluorene), 1.95–1.97 (m, 4H, Methylene), 0.5–1.0 (m, 30H, methyl, methylene, methylidyne) $^{13}$C-NMR (125 MHz, $CDCl_3$) δ ppm: aromatic, 152.74, 152.30, 139.38, 138.97, 133.06, 130.28, 127.69, 127.47, 124.63, 121.21, 121.01, 120.89, aliphatic, 55.54, 44.58, 34.88, 33.79, 28.23, 27.28, 22.92, 14.23, 10.52.

Example 6

The following example is used to exemplify the synthesis of 9,9-bis(2'-ethylhexyl)-2-chloro-7-carboxylic acid. The compound has the following structure.

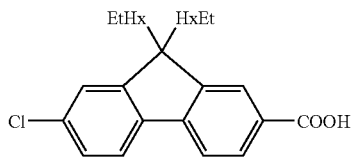

Into a dry, nitrogen-flushed nominal 250 ml three-necked flask equipped with a nitrogen inlet, a thermometer, a magnetic stirring bar and maintained under a positive pressure of nitrogen was placed 2-bromo-7-chloro-9,9-bis(2'-ethylhexl)fluorene (approximately 25 g or 50 mmol) and anhydrous THF (approximately 90 ml). To the cooled solution (approximately −78° C., acetone/dry ice bath) was added dropwise a nominal 1.5M solution of tert-butyllithium (approximately 60 mmol) in pentane. The reaction mixture was stirred at approximately −78° C. for approximately 30 minutes then allowed to warm up to approximately 0° C. (ice bath) for approximately 15 minutes then cooled back to approximately −78° C. $CO_2$ was then bubbled through the mixture for approximately one hour at approximately −78° C. The reaction mixture was allowed to warm up to room temperature while continuing to pass $CO_2$ through the mixture for approximately two hours. The mixture was poured into a nominal 10% HCl solution (approximately 50 ml). The phases were separated, and the aqueous phase was extracted with ethyl acetate (3×approximately 50 ml). The combined organic layer was washed with brine (2×approximately 50 ml), dried over magnesium sulfate, and concentrated. The crude product was purified by column chromatography using hexanes (approximately 1800 ml) then THF/hexanes (approximately 1/9, v/v, and approximately 2500 ml) as an eluent on silica gel to afford approximately 18 g (yield approximately 76%)* of the desired product as a white powder.

*Starting material (approximately 4.1 g or 17%) was recovered ($R_f$=0.75 by hexanes as eluent).

$^1$H NMR (500 MHz, $CDCl_3$) δppm: 8.15–8.20(m, 2H, H-fluorene), 7.78 (d, J=8 Hz, 1H, H-fluorene), 7.72(d, J=8 Hz, 1H, H-fluorene), 7.43 (td, J=6 Hz, J=2 Hz, 1H, H-fluorene), 7.38 (dd, J=8 Hz, J=1 Hz, 1H, H-fluorene), 2.00–2.15 (m, 4H, methylene), 0.44–1.10 (m, 30H, methyl, methylene, methylidyne). $^{13}$C NMR (125 MHz, $CDCl_3$) δppm:aromatic, 165.34, 154.11, 150.90, 146.12, 138.88, 134.43, 130.05, 127.86, 127.72, 126.30, 125.07, 122.07, 119.96, aliphatic, 55.70, 44.71, 35.12, 34.05, 28.46, 28.38, 27.44, 23.09, 23.04, 14.36, 14.27, 10.68.

Example 7

The following example is used to exemplify the synthesis of 2,5-Bis[7-chloro-9,9-bis(2-ethylhexyl)-9H-fluoren-2-yl]-[1,3,4]oxadiazole. The compound has the following structure.

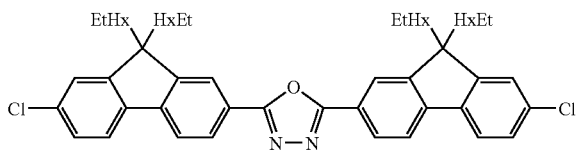

Into a nominal 500 ml three-necked flask equipped with a nitrogen inlet, a thermometer, a magnetic stirring bar, a reflux condenser and maintained under a positive pressure of nitrogen was placed 2-chloro-9,9-bis(2'-ethylhexyl)fluorene-7-carboxylic acid (approximately 19 g or 40 mmol), hydrazine monohydrochloride (approximately 1.4 g or 20 mmol), phosphorus pentoxide (approximately 17 g or 60 mmol), and methanesulfonic acid (approximately 150 ml). After stirring at approximately room temperature under nitrogen for approximately five minutes, the mixture was then heated to and maintained at approximately 105° C. (oil bath) for approximately five hours.

After cooling, the reaction mixture was poured over stirring ice water/methanol (approximately 500 ml, 1:1, v/v), filtered off the solid product, washed with methanol (approximately 150 ml), and then allowed to air dry.

The crude product was purified by column chromatography using ethyl acetate/hexanes (approximately 5%, v/v, approximately 2500 ml) as an eluent on silica gel column to afford approximately 17.4 g (approximately 95%)* of the desired product as a pale yellow solid. Analytical pure white crystals was obtained on recrystallization from acetone.

$^1$H NMR (500 MHz, CDCl$_3$) δppm: 8.21(s, 2H, H-fluorene), 8.17 (dd, J=8 Hz, 1.5 Hz, 2H, H-fluorene), 7.85 (d, J=8 Hz, 2H, H-fluorene), 7.72(d, J=8 Hz, 2H, H-fluorene), 7.44 (td, J=6 Hz, J=2 Hz, 2H, H-fluorene), 7.39 (dd, J=8 Hz, J=2 Hz, 2H, H-fluorene), 2.01–2.18 (m, 8H, methylene), 0.70–1.10 (m, 36H, alkyl), 0.50–0.70 (m, 24H, alkyl). $^{13}$C NMR (125 MHz, CDCl$_3$) δ ppm: aromatic, 165.34, 153.61, 151.71, 144.11, 138.97, 134.17, 127.88, 126.54, 125.03, 124.95, 122.95, 122.52, 121.76, 120.65, aliphatic, 55.85, 44.85, 35.17, 34.02, 28.44, 27.49, 27.36, 23.09, 23.04, 14.37, 14.28, 10.69.

Example 8

The following example is used to exemplify the synthesis of 2,6-bis[7-bromo-9,9-di(2'-ethylhexyl)fluoren-2-yl]-benzo[1,2-d:4,5-d']-bisoxazole. The compound has the following structure.

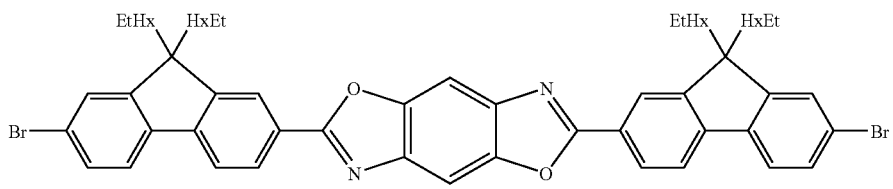

A stirred mixture of 2-bromo-9,9-di(2-ethylhexyl)fluorene-7-carboxylic acid (approximately 880 mg or 1.7 mmol) and 2,5-diamino-1,4-dihydroxybenzene dihydrochloride (approximately 180 mg or 0.86 mmol), phosphorus pentoxide (approximately 0.7 g), and methanesulfonic acid (approximately 11 mL) was maintained at approximately 95° C. for approximately 20 hours under nitrogen atmosphere. After cooling, the reaction mixture was poured into methanol with stirring to precipitate the product. The crude product was purified by chromatography using ethyl acetate/hexane (approximately 5/95), yielding approximately 0.61 g yellow solid. Pale yellow floccules were obtained on recrystallization from the mixture of acetone and THF.

$^1$H-NMR (500 MHz, CDCl$_3$) δ ppm: 8.32–8.34 (m, 4H, H-fluorene), 7.99 (s, 2H, H-fluorene), 7.85 (d, J=8.0 Hz, 2H, H-fluorene), 7.66 (d, J=8.0 Hz, 2H, H-fluorene), 7.59–7.61 (m, 2H, H-fluorene), 7.54 (dd, J=8 Hz, J=2 Hz, 2H, H-fluorene), 2.04–2.18 (m, 8H, methylene), 0.53–0.99 (br m, 60H, alkyl). $^{13}$C NMR (125 MHz, CDCl$_3$) δ ppm: aromatic, 164.89, 153.80, 151.28, 148.85, 144.00, 140.78, 139.35, 130.48, 127.85, 127.21, 125.46, 123.35, 122.09, 121.94, 120.46, 100.93, aliphatic, 55.673, 44.72, 34.99, 33.82, 28.26, 27.30, 22.90, 14.12, 10.55

Example 9

The following example is used to exemplify the synthesis of 9,9-bis(2'-ethylhexyl)-2-chloro-7-fluoreneboronic acid. The compound has the following structure.

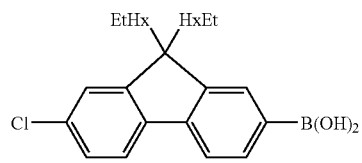

A solution of 2-bromo-7-chlorofluorene (approximately 29 g or 57 mmol) in approximately 400 ml anhydrous tetrahydrofuran was cooled down to approximately −78° C. in a dry ice/acetone bath, to which n-butyllithium (nominal 2.5M solution in hexane, approximately 22 ml or 55 mmol) was added by a syringe. The rate of addition was kept slow so that the temperature of the mixture was maintained below approximately −70° C. An orange-red solution was formed after approximately one hour and a solution of triisopropylborate (approximately 25 ml or 110 mmol) was added rapidly. The mixture was stirred at approximately −78° C. for approximately one hour, and then the cooling bath was removed. The mixture was stirred at approximately room temperature overnight (i.e., for several hours). The reaction mixture was then poured into approximately 1000 ml ice/water containing approximately 100 ml of concentrated HCl and stirred for approximately one hour before it was extracted by ethyl ether (3×approximately 250 ml). The combined ether extracts were washed by saturated aqueous solution of sodium chloride (2×approximately 250 ml) and dried over MgSO$_4$. Evaporation of the solvents afforded a crude product approximately 28 g. Column chromatography purification (silica gel column, hexane, ethyl ether as eluents) afforded approximately 7.4 g product as a pale yellow oil.

Example 10

The following example is used to exemplify the synthesis of 2,5-Bis[7-chloro-9,9-bis(2-ethylhexyl)-9H-fluoren-2-yl]-tetrafluorobenzene. The compound has the following structure.

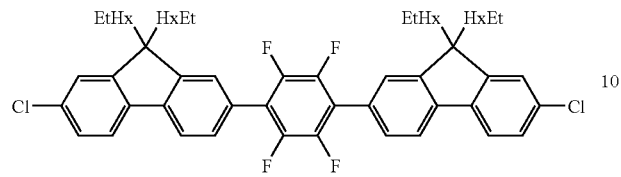

In a nominal 100 ml three-necked flask fitted with a magnetic stirrer, a condenser and a septa, under argon atmosphere was placed a mixture of 2-chlorofluorene-7-boronic acid (approximately 3.3 g or 7.0 mmol), 1,4-dibromotetrafluorobenzene (approximately 1.0 g or 3.3 mmol), toluene (approximately 18 ml) and aqueous potassium carbonate (nominal 2M in water, approximately 12 ml). The mixture was degassed with argon and maintained under argon. Tetrakis(triphenylphosphine)palladium(0) (approximately 80 mg or 0.07 mmol) was weighed in dry box and added to the mixture by a syringe as a toluene slurry. The mixture was stirred at room temperature for approximately five minutes and then heated at approximately 85° C. oil bath overnight (i.e., for several hours). Additional Tetrakis (triphenylphosphine) palladium(0) (approximately 80 mg or 0.07 mmol) and 2-chlorofluorene-7-boronic acid (approximately 0.88 g or 1.9 mmol) was added. The mixture was stirred for another approximately 24 hours. The mixture was then cooled to room temperature and extracted by ethyl ether (4×approximately 50 ml). The combined organic layers were washed by saturated aqueous solution of sodium chloride and dried over MgSO$_4$. Evaporation of the solvent affords a crude product which was further purified by column chromatography (silica gel, hexane and then ethyl ether/hexane, approximately 4%). Yield was approximately 2.9 g product (approximately 88%).

$^1$H NMR (500 MHz, CDCl$_3$) δppm: 7.82 (d, 2 H), 7.69 (d, 2 H), 7.52–7.56 (m, 4 H), 7.41–7.43 (m, 2 H), 7.37 (d, 2 H), 1.99–2.09 (m, 8 H), 0.55–0.97 (m, 60 H).

Example 11

The following example is used to exemplify the synthesis of 3,6-dibromo-N-(3,5,5-trimethylhexyl) carbazole. The compound has the following structure.

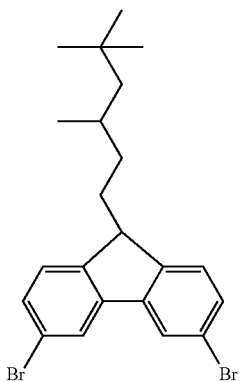

3,6-Dibromocarbazole (19.50 g, 60 mmol) was added to a mixture of 50% w/w aqueous solution of potassium hydroxide (75 ml), toluene (75 ml) and Aliquat-336 (1.0 ml). 1-Bromo-3,5,5-trimethylhexane (18.64 g, 90 mmol) was added dropwise and the reaction mixture was heated at 85° C. for 16 h. After cooling to room temperature, the reaction mixture was transferred to a separation funnel and the organic layer was removed. The aqueous layer was extracted with toluene (3×100 ml) and the combined organic layers were dried over magnesium sulfate. After removal of the solvent in vacuo, the crude product was purified by column chromatography (silica gel, hexane) to yield 24.5 g (90%) of the product as white, 'waxy' solid.

Example 12

The following example is used to exemplify the synthesis of 2,7-Dichloro(3,7-dimethyloctyl)carbazole. The compound has the following structure.

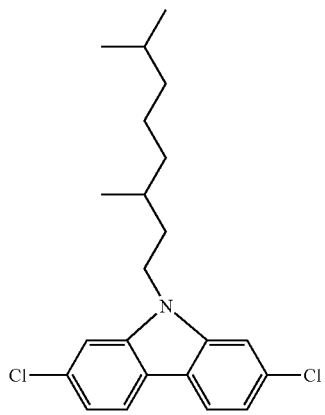

2,7-Dichloro-9-(3,7-dimethyl-octyl)-9H-carbazole 2,7-Dichlorocarbazole (synthesized according to the procedure by Leclerc et al: Morin, Jean-Francois; Leclerc, Mario; *Macromolecules* (2001), 34(14), 4680–4682) (10.7 g, 45.3 mmol) was added to a 50% w/w aqueous solution of potassium hydroxide (75 ml) and Aliquat-336 (0.5 ml). 1-Bromo-3,7-dimethyloctane (12.0 g, 54.3 mmol) was added dropwise and the reaction mixture was heated at 85° C. for 12 h. After cooling to room temperature, methylene chloride was added. The reaction mixture was transferred to a separation funnel and the organic layer was removed. The aqueous layer was extracted with methylene chloride (3×) and the combined organic layers were dried over magnesium sulfate. After removal of the solvent in vacuo, the crude product was purified by column chromatography (silica gel, hexane) to yield 13.5 g of the product as colorless solid.

Examples 13–22

The following conditions were used to generate polymers using monomers listed later in this set of examples. Examples 1–12 include details to prepare many of the monomers.

Under inert conditions, DMF (6 ml) was added to a Schlenck tube equipped with a stirring bar and containing bis(1,5-cyclooctadiene)nickel (0) (2.04 g, 7.41 mmol), 2,2'-bipyridyl (1.16 g, 7.41 mmol), and 1,5-cyclooctadiene (0.80 g, 7.41 mmol). The ensuing deep blue/purple solution was stirred at 60° C. for 30 minutes, and then monomer solution (4.00 mmol) in toluene (25 ml) was added via syringe. The reaction mixture was then stirred at 75° C. for 24 h. The mixture was cooled to room temperature and precipitated into a solution of methanol (100 ml), acetone (100 ml) and concentrated hydrochloric acid (5 ml). After stirring for 2 hours, the mixture was filtered. The solid residue was then dissolved in chloroform, and again precipitated into a solution of methanol (100 ml), acetone (100 ml) and concentrated hydrochloric acid (5 ml). After stirring for 1 hour, the mixture was filtered. The solid was again dissolved in chloroform and precipitated in pure methanol. Finally the residue was successively washed with methanol, water and methanol and dried in vacuo. The polymers are summarized in Table 1.

List of Monomers:
a) 2,5-Bis[7-bromo-9,9-bis(2-ethylhexyl)-9H-fluoren-2-yl]-[1,3,4]oxadiazole
b) 2,5-Bis[7-chloro-9,9-bis(2-ethylhexyl)-9H-fluoren-2-yl]-[1,3,4]oxadiazole
c) 2,6-bis[7-bromo-9,9-di(2'-ethylhexyl)fluoren-2-yl]-benzo[1,2-d:4,5-d']bisoxazole
d) 2,5-Bis[7-chloro-9,9-bis(2-ethylhexyl)-9H-fluoren-2-yl]-tetrafluorobenzene
e) 2,7-Dibromo-9,9-bis(2-ethylhexyl)fluorene
f) 2,7-Dichloro-9,9-bis(2-ethylhexyl)fluorene
g) 3,6-Dibromo-9-(3,5,5-trimethylhexyl)carbazole
h) 2,7-Dichloro(3,7-dimethyloctyl)carbazole
i) 2,7-Dichloro(4-t-butylphenyl)carbazole
j) Tris(4-bromophenyl)amine

TABLE 1

Polymer summary

| | Monomer composition (%) | | | | | | | | | Molecular weight (K) | |
|---|---|---|---|---|---|---|---|---|---|---|---|
| Ex. | a | b | c | d | e | f | g | h | i | j | Mw | Mn |
| 13 | 40 | | | | 40 | | 20 | | | | 462 | 87 |
| 14 | 40 | | | | 40 | | | 20 | | | 209 | 84 |
| 15 | 40 | | | | 59.5 | | | | | 0.5 | 257 | 74 |
| 16 | 60 | | | | 20 | | 20 | | | | 42 | |
| 17 | 40 | | | | 50 | | | 10 | | | 57 | |
| 18 | 40 | | | | 54.5 | | | 5 | | 0.5 | 104 | |
| 19 | | 40 | | | | 40 | | 20 | | | 72 | |
| 20 | 40 | | | | | 40 | | 20 | | | 74 | |
| 21 | 40 | | | | | 40 | | | 20 | | 74 | |
| 22 | | 40 | | | | 40* | | 20 | | | 101 | |

*random mixed alkyl substituted dichlorofluorene

Examples 23–40

Light emitting diodes were fabricated using the polymers in Examples 13–22 as the active semiconducting electroluminescent (EL) polymer layer. For each polymer, Barium/Aluminum or LiF/Ca/Al were used as cathode. PEDOT was used as an anode buffer or hole-transport layer. The device architecture of ITO/PEDOT/EL polymer/cathode was fabricated.

Attention is now addressed to some of the electronic device fabrication details. On top of ITO, a thin layer (nominally 200 nm) of PEDOT was spin-coated and used as anode buffer and the hole-injecting layer. Thickness of the EL polymer layer was approximately 60–80 nm for all the examples. The thickness was measured using a surface profiler (Alpha-Step 500™ Surface Profiler, Tencor Instruments available from KLA-Tencor Corporation of San Jose, Calif.). Devices were made with a layer of Barium/Aluminum or Lithium fluoride/Calcium/Aluminum as the cathode. The metal cathode film was fabricated on top of the EL polymer layer using vacuum vapor deposition at pressures below $1 \times 10^{-6}$ Torr. The cathode area defined the active area of the devices. The deposition speed and the thickness of the cathode layer were monitored with an STM-100 thickness/rate meter (Sycon Instruments, Inc. of Syracuse, N.Y.). Immediately after deposition of barium or lithium fluoride/calcium layer, 500 nm of aluminum capping layer was deposited on the top of barium metal layer. Finally, the device was packaged using a simple glass cover fixed with an ultraviolet (UV) curing epoxy resin. For each of the devices, the current and luminescence vs. voltage curve, and current efficiency (cd/A) vs. voltage curve were measured. The electroluminescence spectra were also recorded. It is to be noted that the devices were not optimized for lifetime.

TABLE 2

Device Performance at 200 cd/m².

| Ex | Polymer | PEDOT (nm) | Polymer (nm) | Baking (° C.) | Cathode | Voltage (V) | Cd/A | CIE u', v' |
|---|---|---|---|---|---|---|---|---|
| 23 | Ex. 13 | 60 | 80 | — | Ba | 6.5 | 4.5 | 0.165, 0.425 |
| 24 | Ex. 14 | 60 | 60 | — | Ba | 4.6 | 3.3 | 0.159, 0.324 |
| 25 | Ex. 14 | 60 | 60 | 180 | Ba | 4.7 | 2.7 | 0.153, 0.344 |
| 26 | Ex. 15 | 60 | 60 | — | Ba | 5.4 | 4.0 | 0.145, 0.325 |
| 27 | Ex. 15 | 60 | 60 | 180 | Ba | 6 | 3.2 | 0.147, 0.328 |
| 28 | Ex. 16 | 60 | 60 | — | Ba | 5.3 | 1.8 | 0.190, 0.356 |
| 29 | Ex. 17 | 60 | 60 | — | Ba | 5.6 | 1.4 | 0.182, 0.406 |
| 30 | EX. 18 | 60 | 60 | — | Ba | 8 | 1.1 | 0.159, 0.318 |
| 31 | | 60 | 60 | — | Ba | 5.9 | 1.1 | 0.286, 0.274 |
| 32 | Ex. 19 | 60 | 60 | — | Ba | 5.1 | 1.5 | 0.178, 0.255 |
| 33 | Ex. 20 | 60 | 80 | — | Ba | 4.3 | 2.0 | 0.151, 0.348 |
| 34 | Ex. 20 | 60 | 80 | 180 | Ba | 4.6 | 1.3 | 0.153, 0.350 |
| 35 | Ex. 20 | 60 | 80 | — | LiF/Ca | 5 | 1.7 | 0.153, 0.330 |
| 36 | Ex. 20 | 60 | 80 | 180 | LiF/Ca | 5.2 | 1.3 | 0.155, 0.301 |
| 37 | Ex. 21 | 60 | 80 | — | Ba | 4.7 | 2.0 | 0.162, 0.324 |
| 38 | Ex. 21 | 60 | 80 | 180 | Ba | 4.6 | 2.0 | 0.159, 0.316 |
| 39 | Ex.22 | 120 | 80 | — | Ba | 8.2 | 0.4 | 0.171, 0.197 |
| 40 | Ex.22 | 120 | 60 | — | Ba | 7.6 | 0.2 | 0.177, 0.167 |

FIGS. 2–5 includes plots showing how current and luminance for light emitting diode devices changes with voltage. FIGS. 2–5 correspond to Example 23, Example 24, Example 26, and Example 35, respectively.

FIGS. 6–9 include plots showing how efficiency for light emitting diode devices change with voltage. FIGS. 6–9 correspond to Example 23, Example 24, Example 26, and Example 35, respectively.

FIGS. 10–13 include plots showing electroluminescence spectra for light emitting diode devices. FIGS. 10–13 correspond to Example 23, Example 24, Example 26, and Example 35, respectively.

Examples 41–44

Examples 41–44 demonstrate that energy levels of HOMO and LUMO were controlled separately without a change in emission color. To prepare the samples for the measurements, the copolymer was first dissolved in chloroform together with small amount of a supporting electrolyte. Then the copolymer film was cast onto surface of a graphite working electrode by drop coating. The film was dried by using the dry nitrogen.

Cyclic voltammetry measurements were carried out on BAS 100A electrochemical analyzer available from Bio Analytical Systems. Silver wire was used as a reference electrode, platinum wire as an auxiliary electrode, graphite as the working electrode, and approximately 0.1 M tetrabutylamonium phosphorus hexafluoride solution in acetonitrile as a supporting electrolyte. The scan rate usually was approximately 50 mV/s.

FIGS. 14–17 include plots showing cyclic voltammetry measurements for different copolymer materials. FIGS. 14–17 correspond to Example 41, Example 42, Example 43, and Example 44 (Reference polymer). Current-voltage (IV) curves are shown for these examples.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A molecule comprising the structure in Formula I below:

A—Q—Z—Q—A     (I)

wherein:
   A is selected from Cl, Br, I, and tosylate;
   Q is an aromatic group, wherein Q has at least one substituent selected from alkyl, heteroalkyl, alkenyl, heteroalkenyl, alkynyl, heteroalkynyl, aryl, arylalkyl, heteroaryl, heteroarylalkyl, and NR', where R' is H or an alkyl, and
   Z is an electron deficient group selected from groups having an oxazole moiety, groups having a thiazole moiety, and fluorinated aromatic groups.

2. The molecule of claim 1 wherein the aromatic group in Q is selected from fluorenes, spirofluorenes, phenyls, biphenyls, bridged biphenyls, naphthalenes, and anthracenes.

3. The molecule of claim 1 comprising the structure in Formula IV below:

(IV)

wherein Z is selected from:

wherein
$R_1$–$R_8$ are the same or different and are selected from alkyl, heteroalkyl, alkenyl, heteroalkenyl, alkynyl, heteroalkynyl, aryl, arylalkyl, heteroaryl, heteroarylalkyl, and NR',
R' is H or an alkyl;
u, v, w, and x are numbers of substituents on the benzene rings and are the same or different and each of u, v, w, and x is in a range of 0–3; and
A is selected from Cl, Br, I, and tosylate.

4. The molecule of claim 3, where is each of $R_1$, $R_5$, and $R_6$ comprises a 2'-ethylhexyl group.

5. The molecule of claim 3, wherein each of u, v, w, and z is zero.

6. The molecule of claim 3, wherein A is Cl.

7. A molecule comprising the structure in Formula I below:

A—Q—Z—Q—A     (I)

wherein:
   A is selected from Cl, Br, I, and tosylate;
   Q is an aromatic group with at least one substituent selected from alkyl groups having from 1 to 20 carbon atoms, and
   Z is an electron deficient group selected from groups having an oxazole moiety, groups having a thiazole moiety, and fluorinated aromatic groups.

* * * * *